Figure 1:
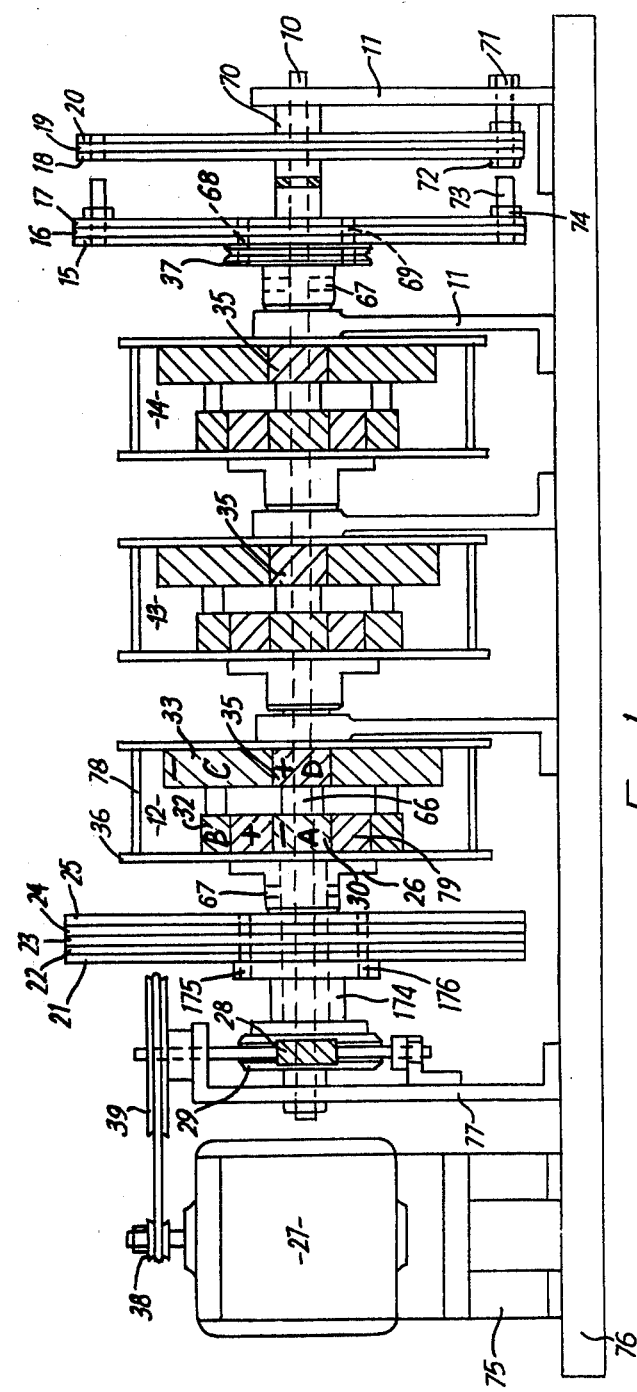

United States Patent [19]

Heaton

[11] 4,204,436
[45] May 27, 1980

[54] IMPROVEMENTS IN OR RELATING TO EPICYCLIC GEAR MECHANISM

[76] Inventor: Harry Heaton, 318 Gerald Rd., Pendleton, Salford M6 6AZ, England

[21] Appl. No.: 810,383

[22] Filed: Jun. 27, 1977

[51] Int. Cl.² .............................................. F16H 57/10
[52] U.S. Cl. ......................................... 74/767; 74/751
[58] Field of Search .................... 74/751, 752 B, 793, 74/767, 766

[56] References Cited

U.S. PATENT DOCUMENTS

| | | | |
|---|---|---|---|
| 1,777,490 | 10/1930 | Hardie | 74/802 |
| 2,163,035 | 6/1939 | Grupe | 74/751 |
| 2,290,835 | 7/1942 | Lorimor | 74/572 |
| 3,296,894 | 1/1967 | Moan | 74/572 |
| 3,479,905 | 11/1969 | Helrigel | 74/572 |
| 3,913,415 | 10/1975 | Herr | 74/767 |
| 4,019,406 | 4/1977 | Herr | 74/766 |

FOREIGN PATENT DOCUMENTS

| | | |
|---|---|---|
| 468772 | 10/1935 | United Kingdom ...................... 74/751 |
| 1311186 | 3/1973 | United Kingdom. |
| 1369756 | 10/1974 | United Kingdom. |
| 1426276 | 3/1976 | United Kingdom. |

OTHER PUBLICATIONS

Thomas Bevan, Theory of Machines, M. Sc. Tech., (Manchester), pp. 350–353, reprint 1945.
F. D. Jones, Ingenious Mechanisms, reprint 1957, pp. 324–329.

Primary Examiner—Samuel Scott
Assistant Examiner—G. A. Anderson
Attorney, Agent, or Firm—Fleit & Jacobson

[57] ABSTRACT

An epicyclic gear mechanism having a series of gear trains each including a rotatable cage, a plurality of planet gears, a stationary gear pinion and an output gear, all of the gear trains being mounted about a fixed shaft. The output gear of one gear train is operably associated with the input gear of a succeeding gear train and is rotatable relative to its cage, and a final output mechanism is associated with the last gear train of the series.

13 Claims; 37 Drawing Figures

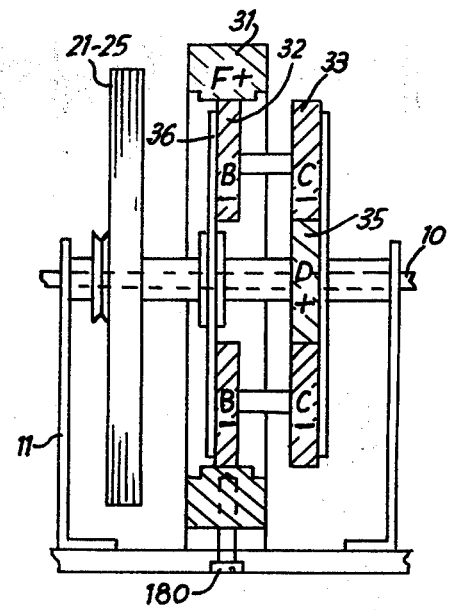
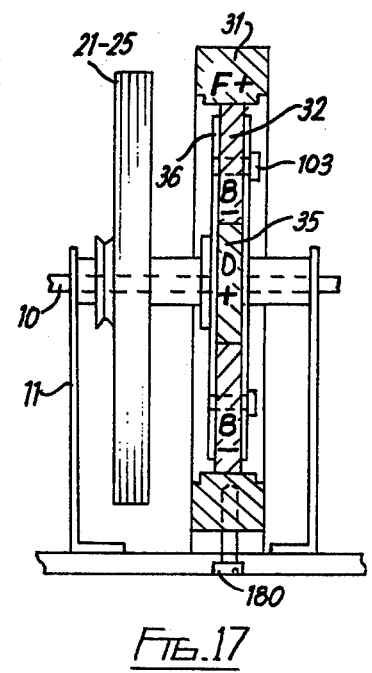
FIG.16   FIG.17
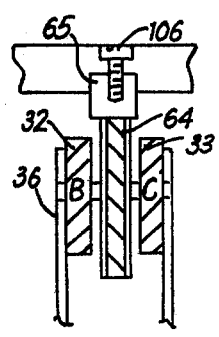
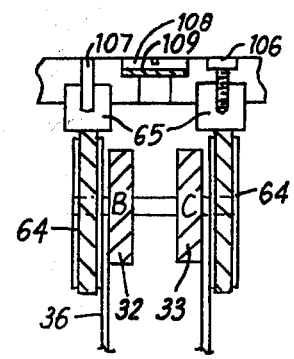
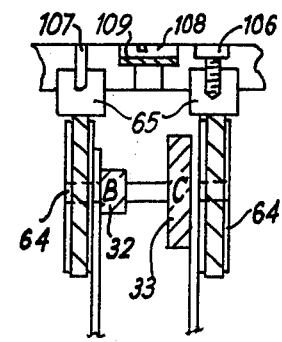
FIG.22   FIG.23   FIG.24

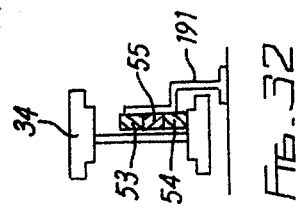
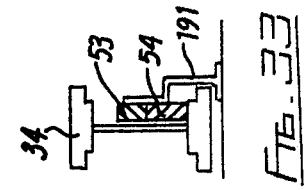
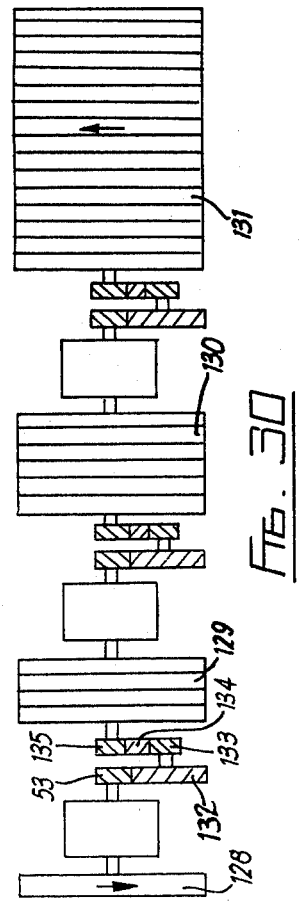
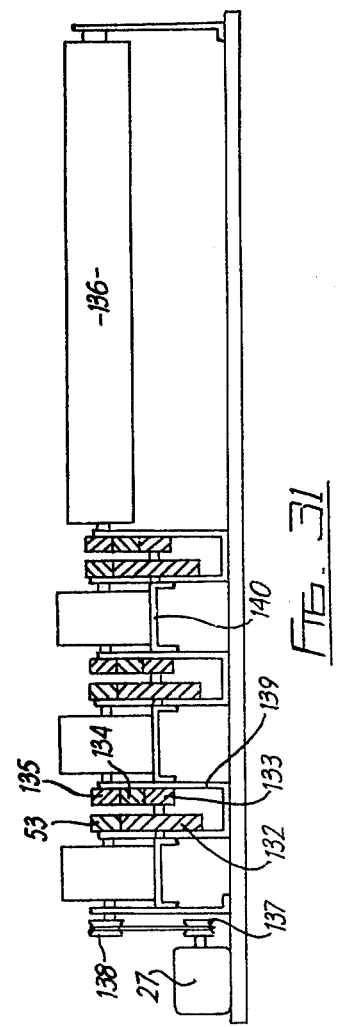

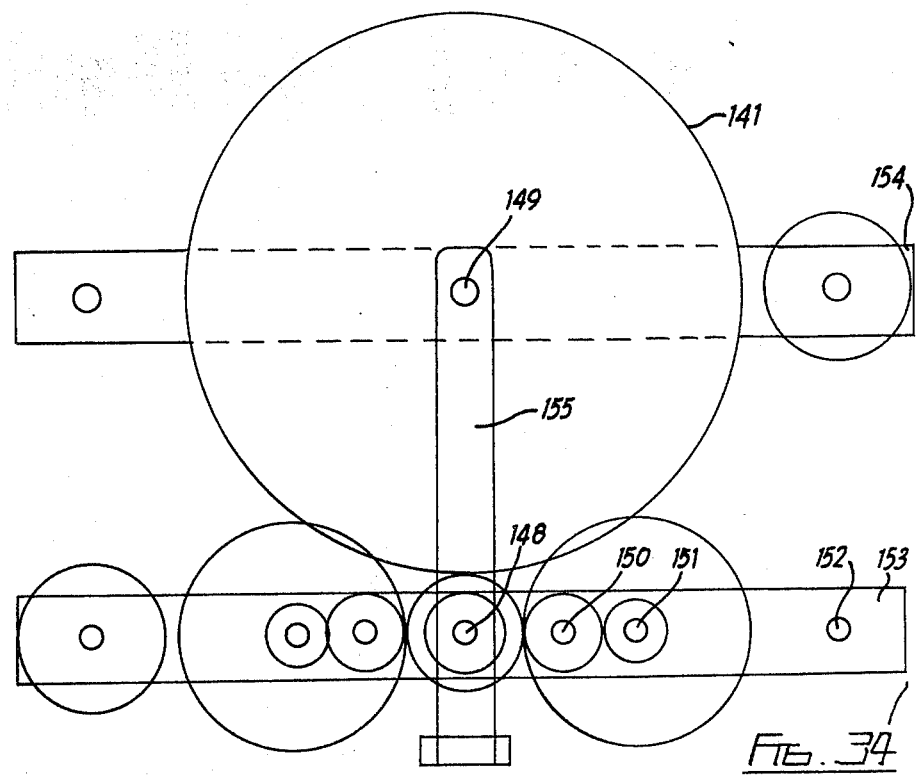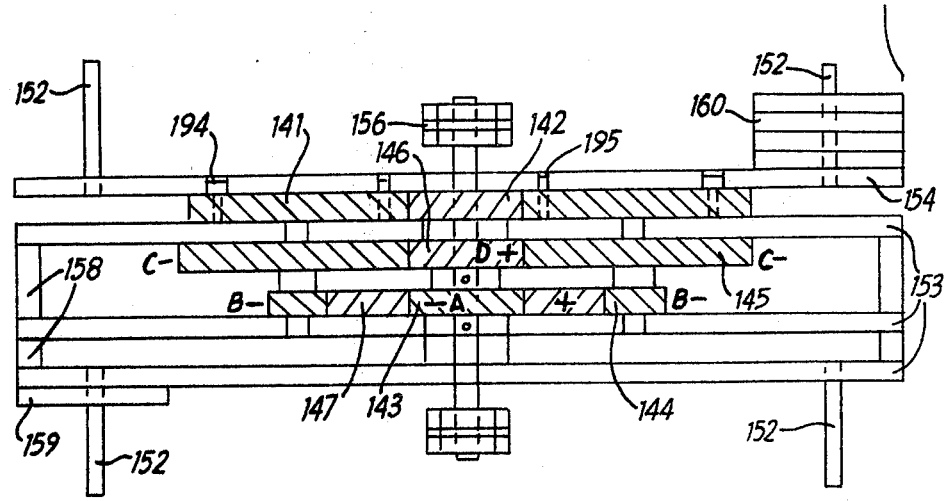
FIG. 34

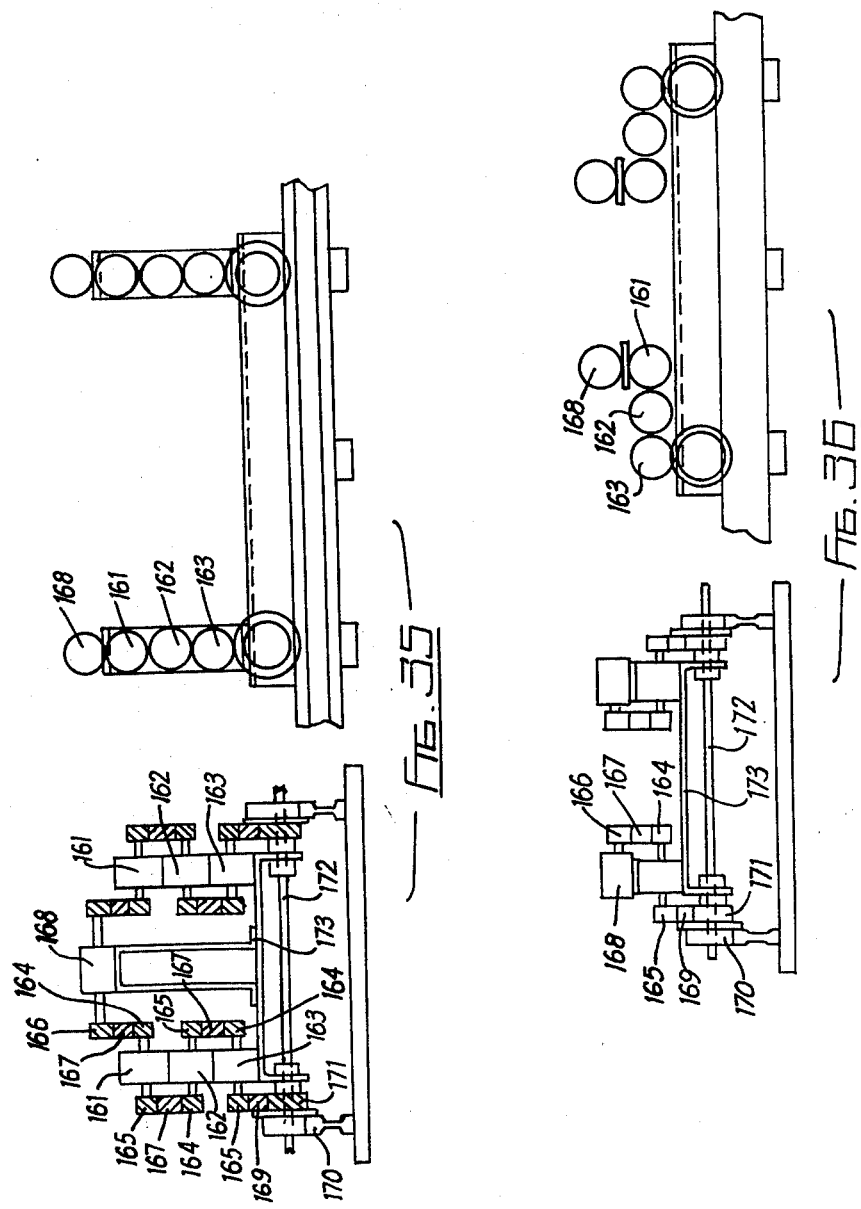

IMPROVEMENTS IN OR RELATING TO EPICYCLIC GEAR MECHANISM

This invention concerns epicyclic gear mechanisms.

Gear mechanisms of the kind envisaged find application, for example, in load lifting equipment, such as travelling cranes, mobile cranes, tower cranes and the like. The mechanism may also be used as driving means for machines of various types in which high torque is required.

Thus according to the present invention there is provided an epicyclic gear mechanism characterised in that there is provided a series of gear trains on a fixed shaft, each gear train including a rotatable cage, at least two planet gears on the cage, and rotatable relative to the cage, a stationary gear pinion and an output gear rotatable relative to the cage, and connected to an input pinion, of a successive gear train, there being a stepwise increase in output speed of gear trains and a final output means in the form of an output pulley or gear rotatable on the stationary shaft.

The invention will now be described further, with reference to the accompanying drawings in which several alternative forms of gear mechanisms are illustrated somewhat schematically and by way of example only, of the many forms of gear mechanisms that can be constructed in accordance with the invention.

Figure 8:
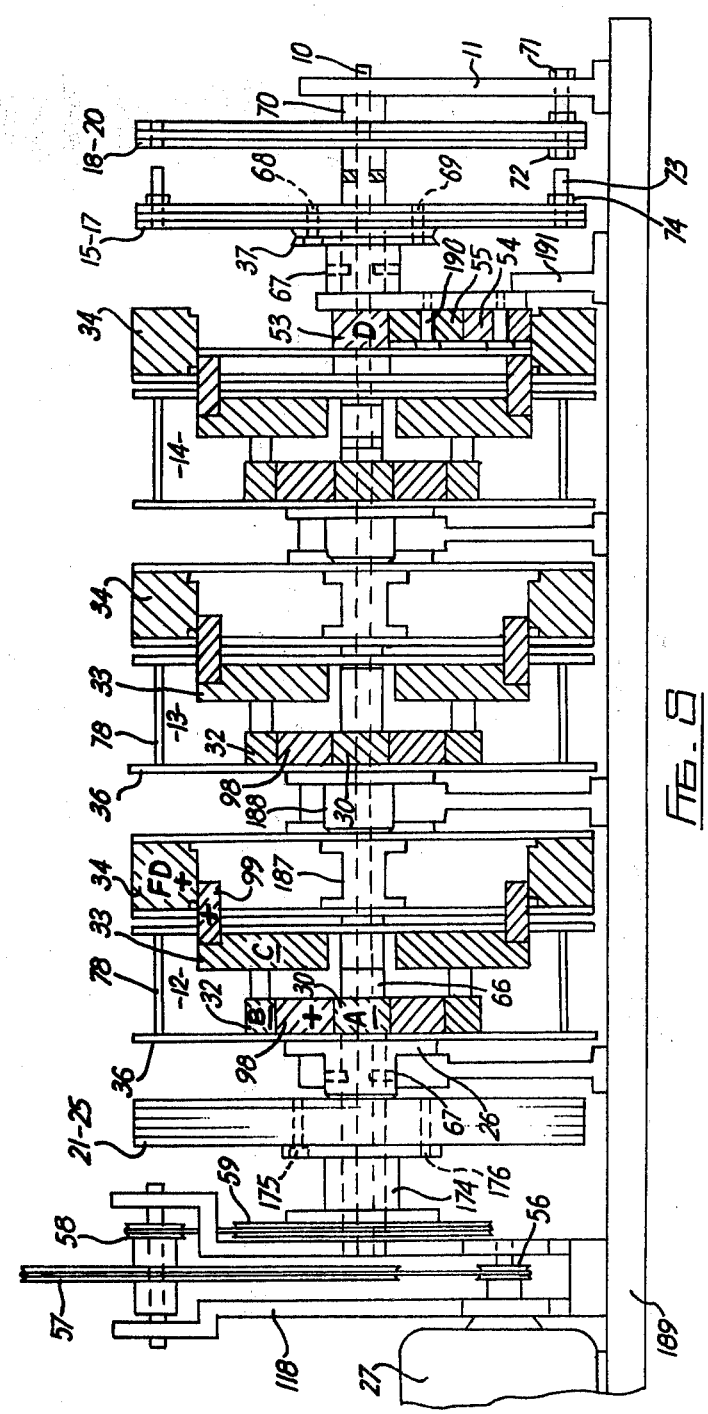
Figure 9:
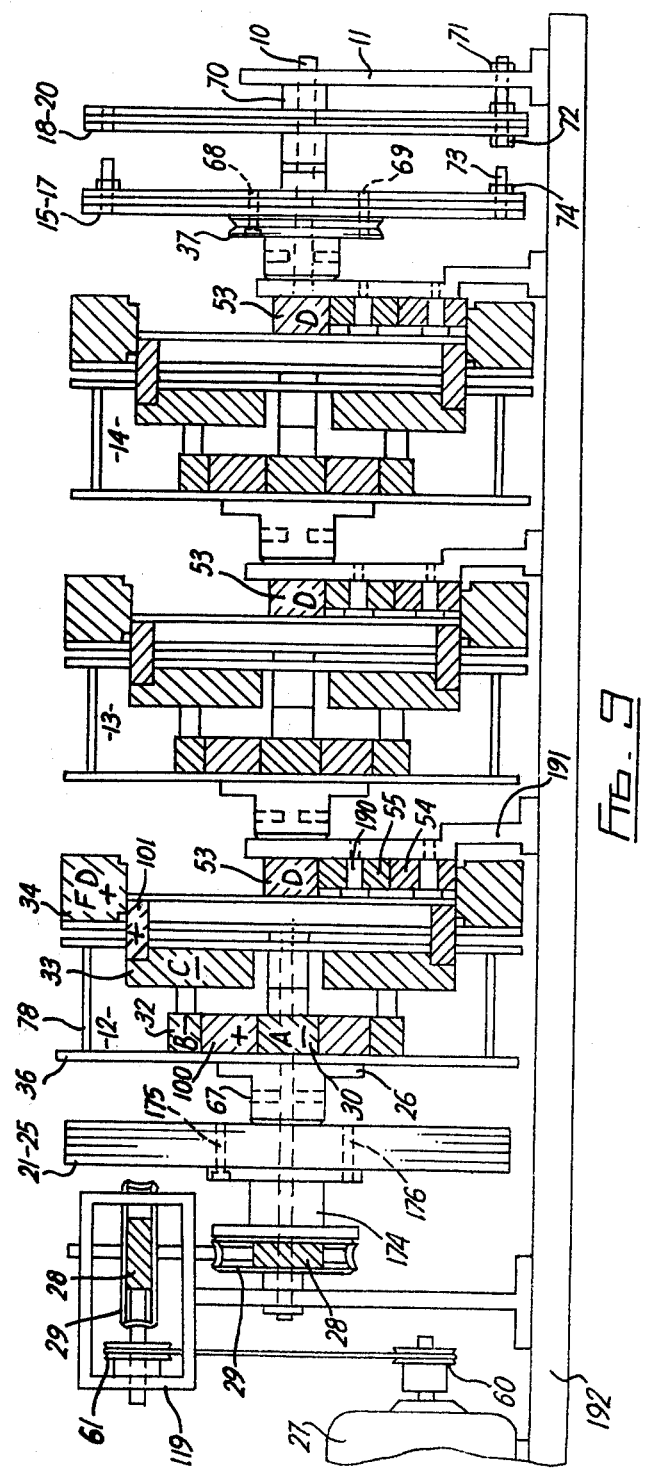
Figure 10:
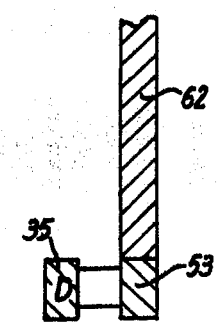
Figure 11:
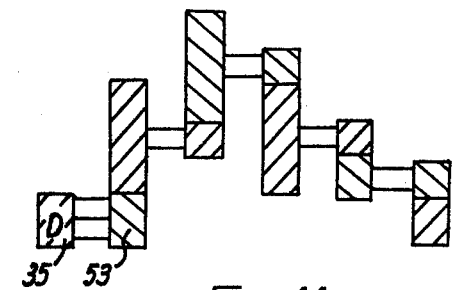
Figure 12:
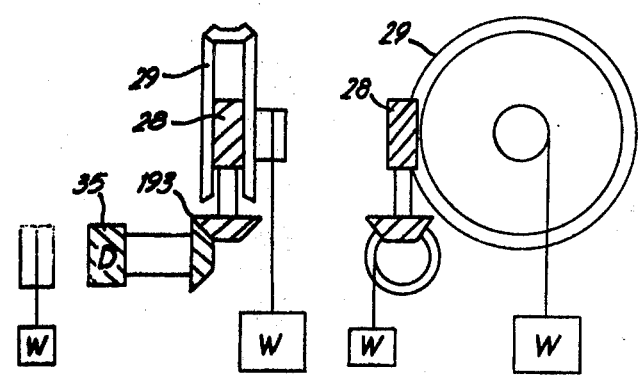
Figure 13:
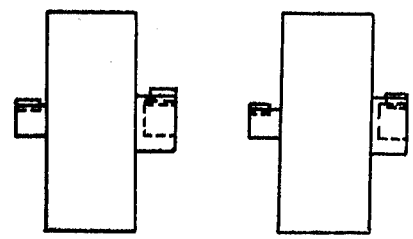

In the drawings:

FIGS 1 to 9 illustrate different gear mechanisms made in accordance with the invention, FIGS. 10 to 12 illustrate schematically arrangements of gear trains and the manner in which loads can be moved, FIG. 13 illustrates how separate units may be constructed and coupled together to form gear assemblies, FIGS. 14 to 21 illustrate how the gear train assemblies may incorporate combinations of the gear arrangements as in FIGS. 1 to 9

Figure 37:
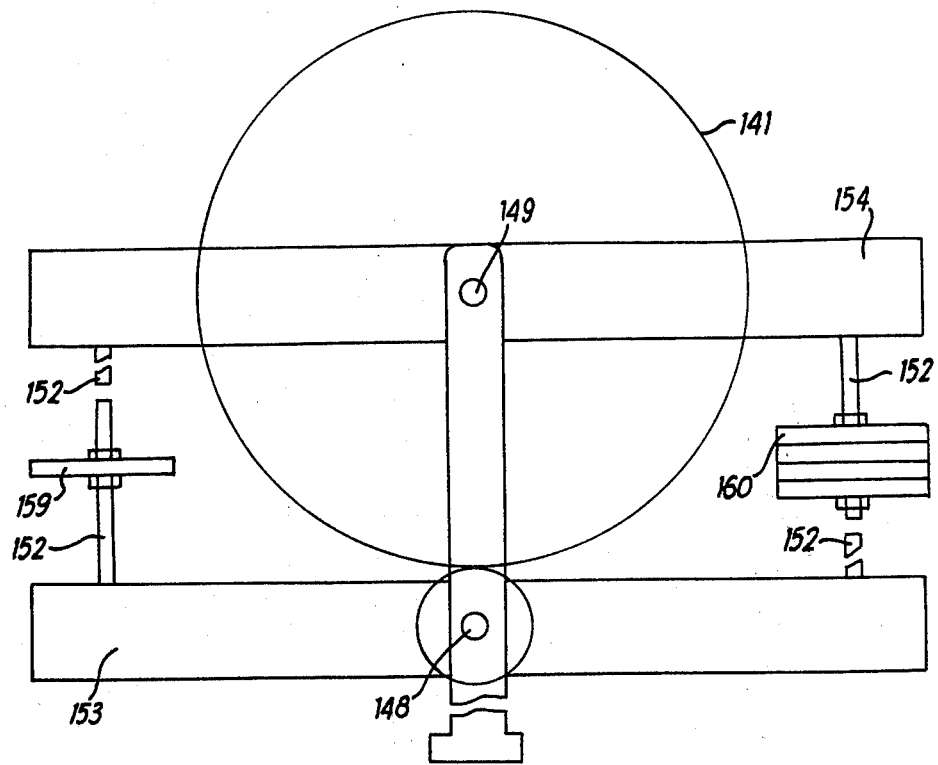

FIGS. 22 to 27 illustrate arrangements for the application of centrifugal force balancing of the mechanisms, FIGS. 28 to 31 illustrate locations of rotary masses applied to the mechanisms, FIGS. 32 and 33 illustrate reverse rotation of the mechanisms, FIG. 34 and FIG. 37 illustrate a mechanism assembly in an apparatus demonstrating balancing of masses, FIGS. 35 and 36 illustrate transport applications of the mechanism assemblies.

Referring now to the drawings, it will be seen that the mechanisms of FIGS. 1 to 9 are similarly composed, in that they each have a fixed centre shaft 10, supported at various points along its length, in carriers 11. Mounted on the shaft 10, at spaced intervals there-along, are a series of epicyclic gear assemblies 12, 13, 14. These are shown as being assembled together, and not as separate units, although separate units could be constructed, as in FIG. 13 and subsequently coupled together. It is possible to couple together, all of the gear units shown in FIGS. 1 to 9 if desired, to give an extremely large input reduction.

On the fixed centre shaft 10, in each of the gear assemblies shown, is fixed for example, by a key or peg 66 an external gear A 30, about which the epicyclic gear assemblies revolve, in addition to revolving about their own central axis. In some of the assemblies, a fixed internal gear F 31, has been substituted for the fixed external gear A 30, (see FIGS. 3, 4, 5 and 6). As can also be seen, there are provided integral gears B 32 and C 33, and also a freely revolving centre internal gear FD 34 (see FIGS. 7, 8, 9) on the same axis as the fixed gear A 30, or fixed gear F 31. These gears are also marked, with either a minus or positive sign, and this minus or positive sign denotes whether one revolution is to be subtracted or added, to their observed revolutions, and in the case of the centre gear D 35, or gear FD 34, which are shown in the assemblies as plus gears, this means that one revolution is to be added to their revolutions, which then become, observed and actual revolutions, that is, in the case of centre freely revolving positive gear D 35, its observed and actual revolutions are either, $A/B \times C/D + 1$ or $F/B \times C/D + 1$ and in the case of the centre freely revolving gear FD 34, its observed and actual revolutions would be $A/B \times C/FD + 1$ or $F/B \times C/FD + 1$.

Thus with reference to FIG. 1. of the drawings, with the fixed external centre gear A 30, of 1½ inches diameter, and the gear B 32, of ¾ inches diameter, and gear C 33, of 3 inches diameter, and centre gear D 35, of 1¼ inches diameter then when one revolution of the input disc 36 which drives the integral gears B 32 and C 33, around the fixed external gear A 30, is considered, then the observed and actual revolutions of freely revolving centre gear D 35, are $1\frac{1}{2}/\frac{3}{4} \times 3/1\frac{1}{4} + 1$ which is $2 \times 2 + 1$ which equals 5. Thus, in the case of FIG. 1, if the input disc 36 makes 8 revolutions, the observed and actual revolutions of the first assembly would result in the external centre gear D 35, revolving $8 \times 5$ revolutions, i.e. 40 revolutions, and these 40 observed and actual revolutions are transferred to the second assembly, as the input.

With the input disc 36 revolutions for the second assembly being 40, and with the second assembly constructed in exactly the same manner as the first assembly, in so far as gear sizes are concerned, the external freely revolving 1¼ inches diameter centre gear D 35, in the second unit would make $40 \times 5$ revolutions, i.e. 200 revolutions, that is to say, 200 revolutions actual and observed, and this becomes the input for disc 36, revolutions of the third assembly, which again, assuming its gear sizes to be like the gear sizes of the first two assemblies, the output would then be $200 \times 4$ or 1000 revolutions actual and observed.

With a pulley 37, attached to the output gear D 35 of the third assembly, by keys or pegs 67, the latter would revolve at 1000 revolutions per minute on the spindle 10, on which the three epicyclic gear units are revolving. As shown in the drawings, and in particular in FIG. 1. there are provided a number of disc like flywheel units, at the output end of the gear assembly, these fly-wheel units being indicated by the reference numerals 15, 16, 17, 18, 19 and 20. As shown, three of the fly-wheel units, i.e. 15, 16 and 17 are secured to the pulley 37, by screws and dowels 68 and 69, and the other three discs 18. 19 and 20 are located in an inoperative position adjacent to the pulley 37 on a stationary bush 70, these latter three units 18. 19 and 20, are not revolving, and are held stationary by belts and nuts 71 and 72 in the carrier 11.

The purpose of providing the flywheel units, 18, 19 and 20 or more if required, is to enable the effective weight of the revolving fly-wheel disc units, 15, 16 and 17, to be varied, to ensure that the pulley 37 runs smoothly, these revolving fly-wheel discs 15, 16 and 17 being secured together by bolts and nuts 73 and 74. Thus flywheel disc units can be added to, or removed from, the fixed pulley as desired. Similarly, at the input end of the assembly, are shown further fly-wheel disc units, 21 to 25, these being attached to a hub 26, keyed or pegged to the wormwheel 29, shaft, by keys or pegs 67 and revolving at the same speed as the first unit input disc 36, that is to say at 8 r.p.m. in the previous example.

In order to drive the gear assembly, a 1440 r.p.m. motor 27 is provided, mounted on suitable framework 75, and fixed on a base plate or foundation base 76. Thus for a 1 inch diameter input pulley 38, making 1440 r.p.m. driving onto a 4½ inch diameter pulley 39, output from the latter would be 320 r.p.m. which latter would be the speed of the single pitch worm 28, which drives a 40 tooth wormwheel 29, mounted in a framework 77, attached to the base plate or foundation 76, so that the output r.p.m. of the wormwheel 29 would be 320/40 i.e. 8 r.p.m. Although the apparatus illustrated is not shown with any form of covering or oil bath lubrication, such equipment would be provided as required. Also intermediate gears 79 are shown in the epicyclic gear assemblies 12, 13 and 14 and the epicyclic gears framework, which acts as the input disc 36, is secured by tie bars 78. Also a hub 174 is also attached by screws 175 and dowels 176 to the input flywheel discs 21 to 25.

Figure 2:
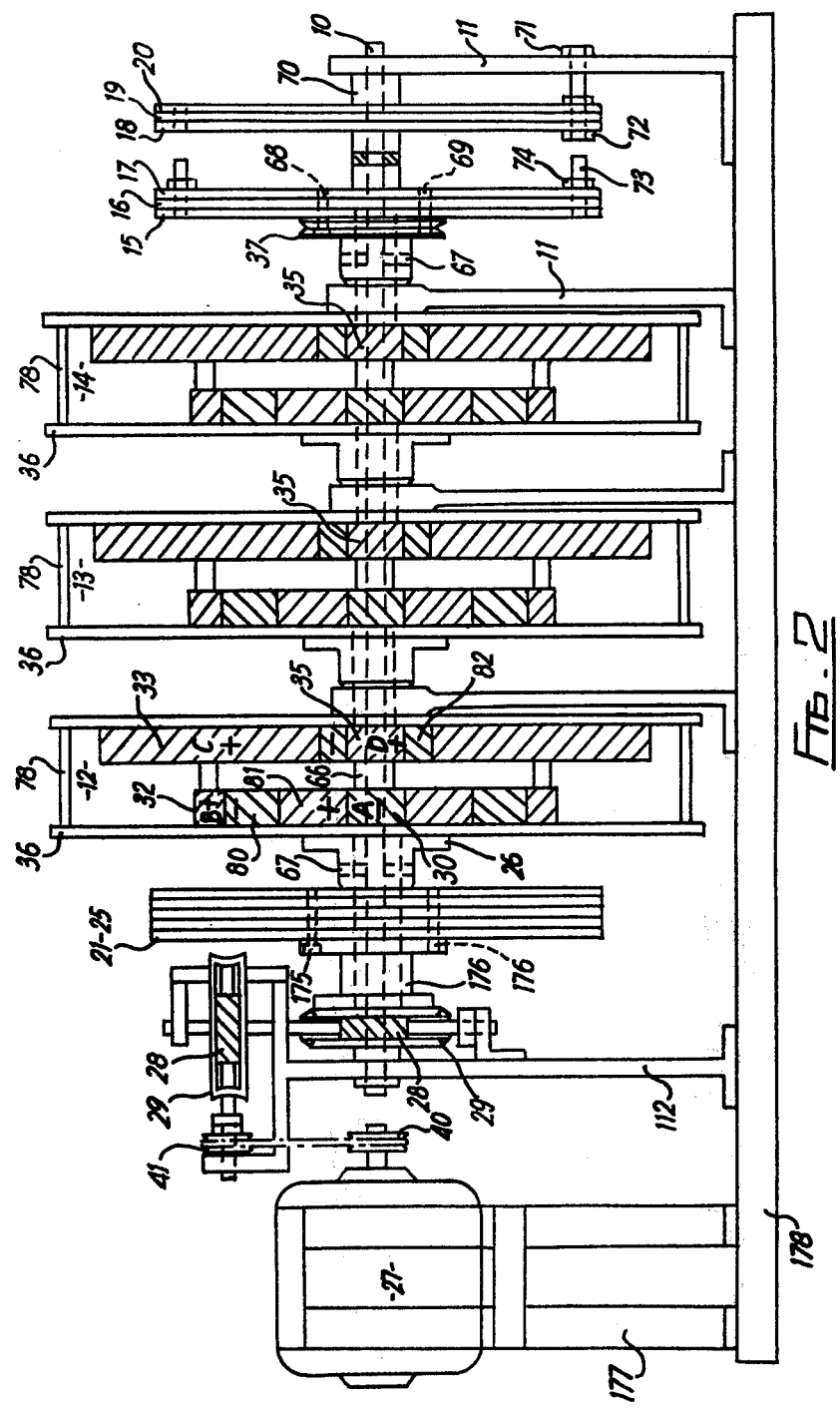

Turning now to FIG. 2. it will be seen that the gear C 33, is larger than the comparable gear of FIG. 1. in fact the gear C 33 is twice the diameter of FIG. 1. that is to say it is 6 inches in diameter so that in this arrangement the observed and actual revolutions of the centre freely revolving gear D 35 of 1½ inches diameter, when one revolution of the input disc 36 is considered, would be A/B×C/D+1 which is 1½/¾×6/1½+1 which is 2×4+1, i.e. 9 r.p.m. for centre gear D 35. If this gear assembly has an input disc 36 making 1.35 revolutions, which results from a pulley 40, of 1½ inches diameter on the spindle of a 1440 r.p.m. motor 27 driving a 1 inch diameter pulley 41 attached to a worm 28, that in turn drives a wormwheel 29, so that the observed and actual revolutions of the first assembly external centre gear D 35, would be 1.35×9 which is 12.15 (for convenience the r.p.m. is assumed to be 12). These 12 observed and actual revolutions are transferred to the second unit, and become the input for that unit. Assuming the second unit to have gears of the same size as the first, then the centre gear D 35, in the second unit assembly would make 12×9 i.e. 108 observed and actual revolutions (since the actual and observed revolutions of the first centre gear D 35, are 12.15, the actual and observed revolutions of the second gear D 35, will be assumed to be 109. The 109 revolutions of this unit become the input of the third assembly, so that the actual and observed revolutions of the third assembly would be 109×9 or 981, assuming the gears of the third assembly to be exactly the same as those of the preceding two assemblies. A pulley 37, attached to the output of the third assembly, therefore, would make 981 r.p.m. which of course would be the rate of revolution of those flywheel discs 15, 16 and 17, which are attached to the pulley 37 by screws 68 and dowels 69. As in the arrangement of FIG. 1. there are further flywheel 18, 19, and 20 adjacent to the output pulley 37, so that smooth running of the latter can be achieved, and similarly there are a group of flywheel discs 21 to 25, at the input to the unit, these latter discs being attached to the first assembly hub 26, and input disc 36 and thus rotating at 1.35 r.p.m.

Again a 1440 r.p.m. motor 27, is utilised, mounted on suitable framework 177 and fixed on a base plate or foundation 178. So that with a 1½ diameter inch pulley 40, on the output shaft of the motor 27, driving a 1 inch diameter pulley 41 which serves as the input, via a worm drive 28 and 29 mounted in a framework 112, attached to the base plate or foundation base 178, to the gear assemblies, the 1 inch diameter pulley 41 would be revolving at 2160 r.p.m. to drive a single pitch worm 28 and 40 tooth wormwheel 29, so that the latter would be rotating at 2160 divided by 40, i.e. 54 r.p.m. In the particular arrangement being described, a second single pitch worm 28 is provided and driven from the first wormwheel 29, so that its rate of revolution would be 54 r.p.m. and assuming this drives a second 40 tooth wormwheel 29, the output r.p.m. of the motor 27 is reduced again to provide the 1.35 r.p.m. input speed for the first gear assembly. Also intermediate gears 80 and 81 and 82 are shown in the epicyclic gear assemblies 12, 13, and 14 and the epicyclic gears framework, which acts as the input disc 36 is secured by tie bars 78. Also a hub 174 is also attached by screws 175 and dowels 176 to the input flywheel discs 21 to 25. The assembly in other respects conforms to that previously described.

Figure 3:
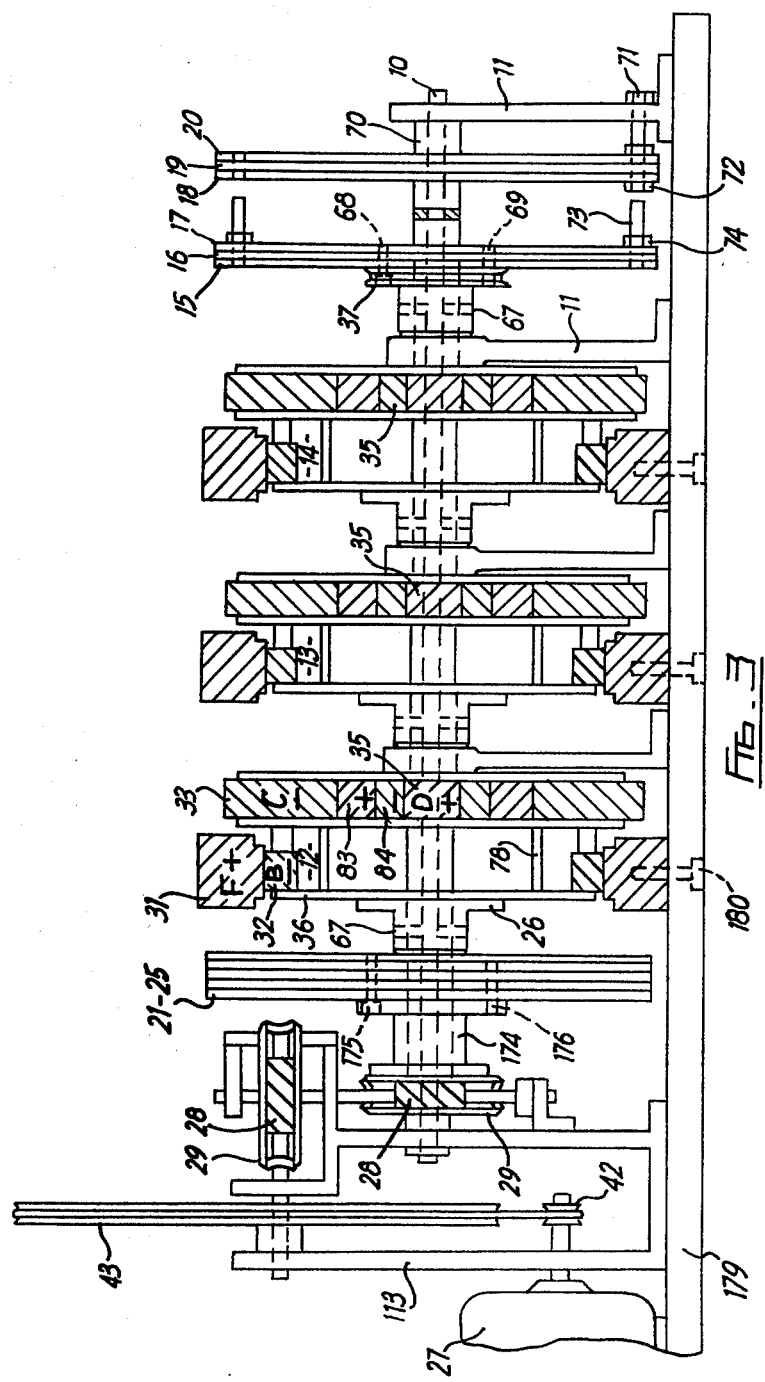

Referring now to FIG. 3. it will be seen that this differs from the arrangements of FIGS. 1 and 2 in that the fixed gear in this arrangement is of 9 inches internal diameter, i.e., fixed gear F 31, secured to base plate or foundation bate 179 by screws 180. In this arrangement, the gears B 32 and C 33, and the centre freely revolving centre gear D 35 are the same as in FIG. 1. that is to say the gear B 32 is of ¾ inch diameter and the gear C 33 and D 35, are respectively 3 inches and 1½ inches diameter. In this arrangement the observed and actual revolutions of the centre freely revolving 1½ inches diameter centre gear D 35, for each one revolution of the input disc 36, would be F/B×C/D+1 which is 9/¾×3/1½+1 which is 12×2+1, i.e., 25 r.p.m.

If, with this particular arrangement, the input disc 36 makes 0.0726 revolutions, so that the observed and actual revolutions of the first assembly external centre gear D 35, would be 0.0726×25 that is 1.815 r.p.m. and these actual and observed revolutions are transferred to the second assembly, that is, the 1.815 r.p.m. becomes the input for the second assembly which latter being of exactly the same construction, in so far as gear sizes are concerned, as the first assembly, will result in the output centre gear D 35 of that assembly making 1.815×25 revolutions, that is to say, the output r.p.m. of the second unit would be 45.375 r.p.m. observed and actual revolutions, and of course, this becomes the input for the third unit, which again, since it has the same gear sizes and construction as the preceding two, would result in an output of 45.375×25 which is 1134 r.p.m. observed and actual revolutions, and it is this 1134 r.p.m. which is applied to the pulley 37 and its attached flywheel discs, 15, 16, and 17. As in the previous arrangements, additional flywheel discs 18, 19, and 20 are provided in order that the effective weight of the revolving flywheel 15, 16, and 17 can be modified as desired, to ensure smooth rotation of the pulley 37. Also as in the previous arrangements, a plurality of flywheel discs 21 to 25 are provided at the input end of the gear assembly and between the input disc 36 and the worm drive arrangement to that disc.

In the arrangement of FIG. 3. the input r.p.m. of 0.0726 is derived from a 1440 r.p.m. motor 27, mounted on the base plate or foundation base 179 by the use of a 1¼ inch diameter pulley 42 on the output shaft of the motor 27, driving a 15½ inch diameter pulley 43 to reduce the r.p.m. of the second pulley shaft to 116 which is the speed of rotation of the first single pitch worm 28, mounted in a framework 113, attached to the base plate or foundation base 179 which drives a 40 toothed wormwheel 29. So that the reduction in speed from 1440 r.p.m. at the first wormwheel 29 is to 2.9 r.p.m. which is utilised as the rate of rotation of the second worm 28 which drives a second 40 toothed wormwheel 29, to further reduce the speed from 2.9 to 0.0726 r.p.m. Also intermediate gears 83 and 84 are shown in the epicyclic gear assemblies 12, 13, and 14 and the epicyclic gear framework, which acts as the input disc 36, is secured by tie bars 78. Also a hub 174 is also attached, by screws 175 and dowels 176 to the input flywheel discs 21 to 25. The assembly in other respects conforms to that previously described.

Figure 4:
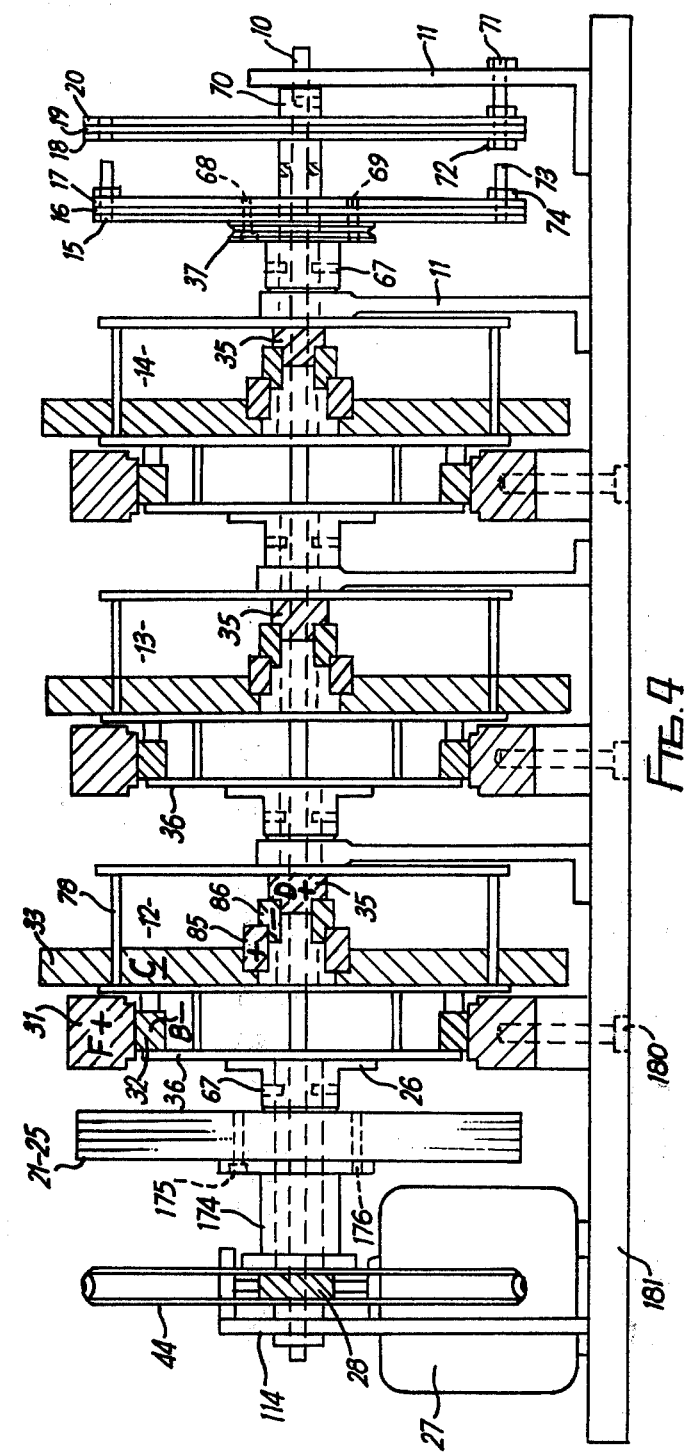

The arrangement of FIG. 4 is to some extent similar to that of FIG. 3 the primary exception being, that the gear C 33 of FIG. 4 is of 6 inch diameter whereas in FIG. 3 the gear C 33 has a 3 inch diameter. In the arrangement of FIG. 4 the observed and actual revolutions of the 1½ inch diameter, freely revolving centre gear D 35 will be $F/B \times C/D + 1$ that is $9/\frac{3}{4} \times 6/1\frac{1}{2} + 1$ which is $12 \times 4 + 1$ which is 49 r.p.m. for the centre gear D 35. Thus 49 r.p.m. would be the input speed for the input of the second assembly, and thus the output observed and actual revolutions of the second gear unit assembly would be $49 \times 49$ namely, 2401 r.p.m. which become the input revolutions for the input of the third assembly, the output from which would be $2401 \times 49$.

Such a high speed output would find little practical application and thus to bring down this output speed to an output of the order of 1000 r.p.m. an extremely large wormwheel 44 or a number of smaller worm or wormwheels, driven by worms 28, mounted in a framework 114 attached to the base plate, or foundation base 181, are required at the input end of the gear train. These assemblies are not shown since the principle of reducing the output speed of the prime mover, by the use of wormwheels and worm drives is illustrated in FIGS. 1 to 3 referred to previously. Also intermediate gears 85 and 86 are shown in the epicyclic gear assemblies 12, 13, and 14 and the epicyclic gears framework which acts as the input disc 36 is secured by tie bars 78. Also a hub 174 is also attached, by screws 175 and dowels 176 to the input flywheel discs 21 to 25. The assembly in other respects conforms to that previously described.

Figure 5:
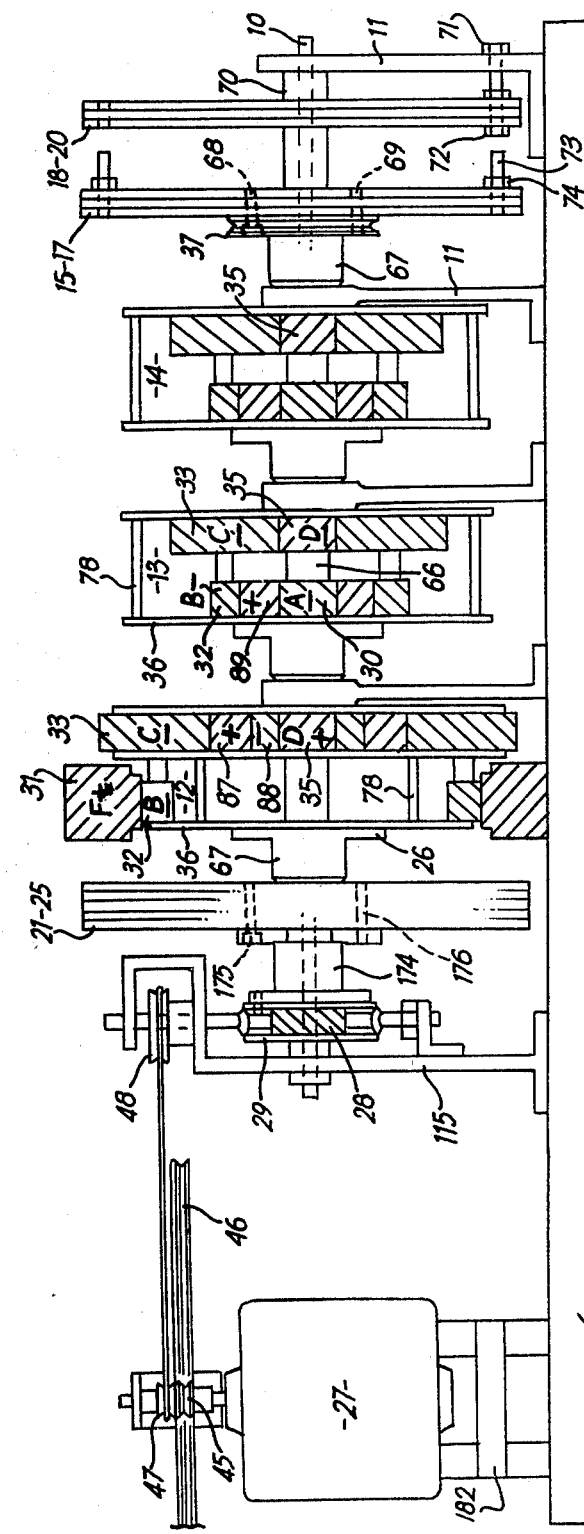

Referring now to FIG. 5. of the drawings the gear unit there illustrated is, in fact, a combination of one of the gear assemblies of FIG. 3. and two of the units of FIG. 1 arranged such that the gear unit of the kind illustrated in FIG. 3 becomes the first unit of the mechanism. Thus when considering one revolution of the input to the first gear unit it will be observed that the actual and observed revolutions of the freely revolving centre gear D 35 which in this case is 1½ inches diameter would be $F/B \times C/D + 1$ i.e. $9/\frac{3}{4} \times 3/1\frac{1}{2} + 1$ i.e. 25 revolutions which becomes the input speed of the input of the second unit.

The observed and actual revolutions of the second unit which again has a freely revolving 1½ inch diameter centre gear D 35 would be $A/B \times C/D + 1$ i.e. $1\frac{1}{2}/\frac{3}{4} \times 3/1\frac{1}{2} + 1$ which is 5 revolutions. So that the output revolutions of the second unit would be 125, and this becomes the input to the third unit, which, since its gear train is exactly the same as that of the second unit, results in an output of $5 \times 125$ r.p.m. which is 625 r.p.m.

Now, if at the input end, a 1440 r.p.m. drive motor 27 mounted on suitable framework 182 and fixed on a base plate or foundation base 183 is provided with a 1½ inch diameter pulley 45 driving a 15½ inch diameter pulley 46 the latter would have 140 r.p.m. which would be the same rate of revolution, as a 1½ inch diameter pulley 47 mounted on the same shaft as the 15½ inch diameter pulley 46, thus if the drive from the 1½ inch diameter pulley 47 is now taken to a 3 inch diameter pulley 48, the revolutions of this latter pulley 48 would be 70, and this pulley 48 is adapted to drive a worm 28, meshing with a 40 toothed wormwheel 29, mounted in a framework 115, attached to the base plate or foundation base 183, which gear is attached to the input of the first gear assembly, via the flywheel discs 21 to 25. So that the input would be 70/40 r.p.m. namely 1.75 r.p.m. and this gives 43.75 r.p.m. observed and actual revolutions of the first unit freely revolving centre gear D 35, this rate of revolution being the same as the input revolutions of the second gear unit. So that the observed and actual revolutions of the second unit would be $43.75 \times 5$ namely 218.75 which becomes the input revolutions of the third unit, the output of which becomes the input revolutions of the third unit, the output of which becomes $218.75 \times 5$ namely 1094 r.p.m. which is the rate of revolution of the pulley 37, attached to the output flywheel discs 15, 16, and 17 by screws 68 and dowels 69, as the latter would also be revolving at 1094 r.p.m. on the spindle. As in the previous arrangements, additional flywheel discs 18, 19, and 20 are provided on a non-rotary extension of the spindle 70, so that the weight of the revolving flywheel discs 15, 16, and 17 can be varied as required. Also intermediate gears 87 and 88 and 89 are shown in the epicyclic gear assemblies 12, 13, and 14 and the epicyclic gears framework, which acts as the input disc 36 is secured by tie bars 78. Also a hub 174 is also attached by screws 175 and dowels 176 to the input flywheel discs 21 and 25. The assembly in other respects conforms to that previously described.

Figure 6:
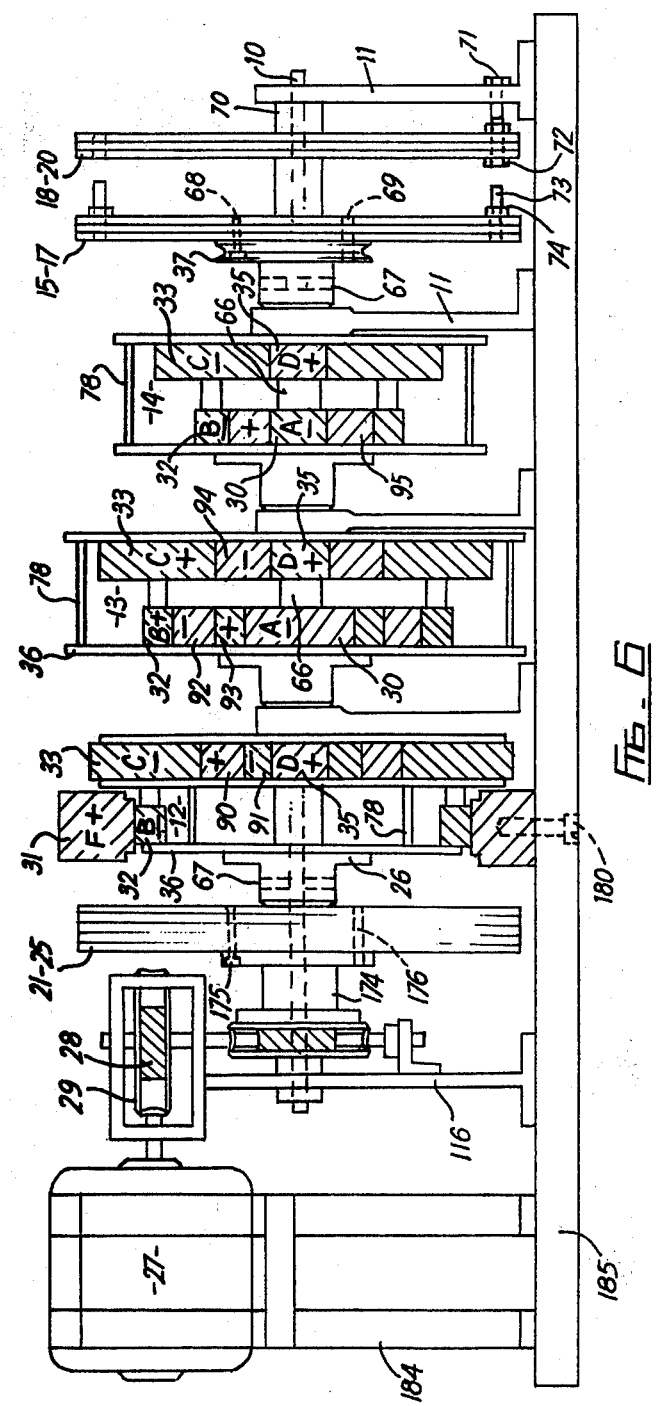

Referring now to FIG. 6 it will be seen that the arrangement is somewhat similar to that of FIG. 5. It should be noted, however, that the fixed gear A 30, in this particular case of the centre gear assembly, is of 3 inch diameter, whereas in the FIG. 5 arrangement it was of 1½ inch diameter. It will also be noted, that the third gear assembly of the FIG. 6 arrangement, is like that of the FIG. 5 arrangement, with the fixed gear A 30, of 1½ inch diameter, and thus taking the gear train as a whole, and assuming, one revolution of the nput disc 36, then in the first assembly, the observed and actual revolutions of the freely revolving centre gear D 35, which is of 1½ inch diameter would be $F/B \times C/D + 1$ namely $9/\frac{3}{4} \times 3/1\frac{1}{2} + 1$ i.e. $12 \times 2 + 1$ namely 25 r.p.m. This of course becomes the input revolutions of the second gear assembly, in which the observed and actual revolutions of the freely revolving 1½ inch diameter centre gear D 35, would be $A/B \times C/D + 1$ that is to say $3/\frac{3}{4} \times 3/1\frac{1}{2} + 1$ namely $4 \times 2 + 1$ i.e. 9 r.p.m. thus the output becomes 225 r.p.m. namely $9 \times 25$ observed and actual revolutions. The input revolutions therefore, of the third assembly, becomes 225 and the output rate of revolution of the freely revolving centre gear D 35, which is of 1½ inch diameter would be $225 \times 5$ namely 1125 r.p.m. and this would be derived from $A/B \times C/D + 1$ that is to say $1\frac{1}{2}/\frac{3}{4} \times 3/1\frac{1}{2} + 1$ which is $2 \times 2 + 1$ which is 5.

If one now applies an input drive to the first gear unit derived from a 1440 r.p.m. motor 27, mounted on suitable framework 184, attached to the base plate or foundation base 185, driving a 40 toothed wormwheel 29, mounted in a framework 116, attached to the base plate or foundation base 185, to give 36 r.p.m. drive to a second worm 28, also driving a 40 toothed wormwheel 29, which applies drive to the first gear assembly, then the drive to this assembly would be 36/40 namely 0.9 r.p.m. So that the actual and observed revolutions of the 1½ inch diameter freely revolving centre gear D 35 of the first unit, would be 22.5. The output revolutions of the second unit would be 22.5×9 namely 202.5 and the third unit assembly would have an output of 202.5×5 namely 1012.5 r.p.m. This in practice would be the rate of revolution of the pulley 37, attached to the flywheel discs 15, 16, and 17 by screws 68 and dowels 69 and also of course the rate of revolution of the flywheel discs 15, 16, and 17. As in the previous arrangement additional flywheel discs 18, 19, and 20 may be mounted on a non-rotating flywheel bush 70 adjacent to the flywheel discs 15, 16, and 17 so that its effective weight may be varied to suit requirements. As in all previously described assemblies, there would be a sump for lubricant, and of course, the mechanisms would be enclosed within a suitable casing. Also, intermediate gears 90-91-92-93-94 and 95 are shown in the epicyclic gear assemblies, 12, 13 and 14 and the epicyclic gears framework, which acts as the input disc 36 is secured by tie bars 78. Also a hub 174, is also attached by screws 175 and dowels 176 to the input flywheel discs 21 to 25. The assembly in other respects conforms to that previously described.

Figure 7:
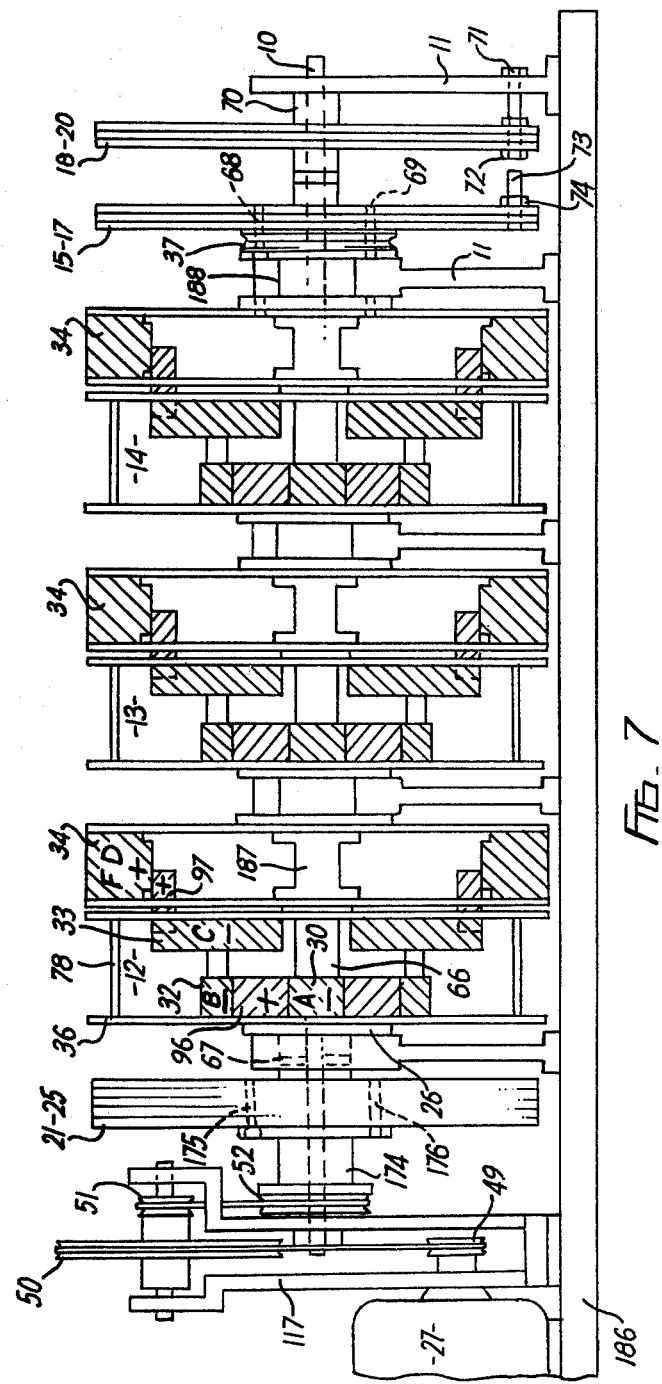

Referring now to FIG. 7 it will be seen, that the arrangement is similar to tht of FIG. 1 but in this particular case, an internal 9 inch diameter gear FD 34 has been substituted for the 1½ inch diameter external centre gear D 35, of FIG. 1. Additionally, the gear C 33 in the arrangement of FIG. 7 is made 3¾ inch diameter, and thus when one revolution of the input disc 36 is considered, then in the first gear assembly, the observed and actual revolutions of the freely revolving gear FD 34 will be A/B×C/FD+1 namely, 1½/¾×3¾/9+1 that is to say 1 and 5/6ths observed and actual revolutions. This becomes the input revolutions for the second assembly, which is exactly the same in construction as the first assembly, so that the observed and actual revolutions of the second assembly will be 1 and 5/6ths×1 and 5/6ths, that is approximately 3.36 r.p.m. which becomes the input for the third assembly, which is exactly the same, in construction, as the previously described assemblies. So that the revolutions at the output of this assembly, will be 3.36×1 and 5/6ths which is approximately 6.16 observed and actual revolutions.

Now if one applies a 1440 r.p.m. prime mover 27, mounted on the base plate or foundation base 186, to supply the input power, for the gear train, and assuming that this has a 1½ inch diameter pulley 49, driving a 6½ inch diameter pulley 50, the output r.p.m. would be 332, which is applied to a 1½ inch diameter pulley 51, carried on the same shaft as the 6½ inch diameter pulley 50, mounted in a framework 117, attached to the base plate or foundation base 186 and this serves to drive a 3 inch diameter pulley 52, attached to a hud 174, which is attached to input flywheel discs 21 to 25, by screws 175 and dowels 176 of the gear assembly. The input therefore to the gear assembly would be 166 r.p.m. so that the output from the first gear unit would be 304 r.p.m., from the second unit 558 r.p.m. and from the third unit 1013 r.p.m. Thus the speed of a pulley 37, at the output end of the gear assembly is 1013 r.p.m. which is the same rate of revolution as the flywheel discs 15, 16, and 17, attached to the pulley 37, by screws 68 and dowels 69, attached to a driving hub 188, which flywheel discs, as can be seen, are of a similar form to those described in the preceding arrangements, namely, they are capable of having mass either increased or decreased by the addition or removal of disc like flywheel elements 18, 19, 20. As in the previous arrangements a number of such elements are provided on a non-rotary bush 70, adjacent to the flywheel discs 15, 16, and 17. Also intermediate gears 96 and 97 are shown in the epicyclic gear assemblies 12, 13, and 14 and the epicyclic gears framework, which acts as the input disc 36, is secured by tie bars 78. Also a hub 174, is also attached by screws 175 and dowels 176 to the input flywheel discs 21 to 25 and to the pulley 52. The assembly in other respects conforms to that previously described.

In the arrangement according to FIG. 8 the gear assembly is somewhat similar to that just described, in that the first and middle and last gear assemblies are similar to those shown in FIG. 7 but in this particular case a 1½ inch diameter centre gear D 53 which is freely revolving on the fixed shaft 10, has been added to the last gear assembly. This latter centre gear, D 53 is driven by ordinarily revolving gears 54 and 55 running on spindles 190 secured in framework 191 from the inside gear perimeter of the output gear FD 34 of the last of the gear assemblies, namely a 9 inch diameter internally toothed gear FD 34. So that when one revolution of the input disc 36 is considered in the first gear unit assembly, the observed and actual revolutions of the 9 inch internal diameter gear FD 34 would be A/B×C/FD+1 namely 1½/¾×3¾/9+1 which, as in the arrangement of FIG. 7 gives an output of observed and actual revolutions of 1 and 5/6ths which becomes the input to the second unit, which since it is of exactly the same construction as the first will have an output 3.36 r.p.m. and the third unit will have an output of 6.16 actual and observed revolutions.

In this particular case however, the 1440 r.p.m. prime mover 27 mounted on the base plate or foundation base 189 is provided with a 1½ inch diameter pulley 56 to drive a 15½ inch diameter pulley 57 to give 140 r.p.m. at the pulley and 140 r.p.m. of a 1½ inch diameter pulley 58, mounted on the same shaft as the 15½ inch diameter pulley 57, mounted in a framework 118, attached to the base plate or foundation base 189. This latter pulley 58, itself drives a 7½ inch diameter pulley 59 to give 28 r.p.m. which is the input speed of the first gear assembly, and of course the flywheel discs 21 to 25, the input end of the machine. Thus the output r.p.m. of the first gear unit will be 28×1 and 5/6ths that is approximately 51 r.p.m. The output from the second assembly would be 51×1 and 5/6ths which gives approximately 94 r.p.m. and thus the output from the third assembly is 94×1 and 5/6ths which is approximately 172.33 r.p.m. Thus 172.33 r.p.m. is applied, by ordinary revolving gears, 54 and 55, running on spindles 190, secured in framework 191, to the 1½ inch diameter freely revolving centre gear D gear 53 to result in the output speed of 1034 r.p.m. namely 172.33/1½×9. The speed of the drive pulley 37, attached to flywheel discs 15, 16, and 17 by screws 68 and dowels 69 and the speed of flywheel discs 15, 16, and 17 at the output end of the gear arrangement is thus 1034 r.p.m. As in the previous arrangements, adjustable mass flywheel discs 18, 19, and 20 are provided, as of course is a sump, for lubricant and a cover for the mechanism. Also intermediate gears 98 and 99 are shown in the epicyclic gear assemblies 12, 13, and 14 and the epicyclic gears framework which acts as the input disc 36, is secured by tie bars 78. Also a hub 174 is also attached by screws 175 and dowels 176 to the input flywheel discs 21 to 25 and to the pulley 59. The assembly in other respects conforms to that previously described.

Turning now to FIG. 9 it will be seen that there is an arrangement in which the gear assembly is similar to that just described in that a 1½ inch diameter centre mounted freely revolving centre gear D 53 is provided at the output of the third gear assembly. It will be noted, however, that a similar freely revolving centre gear D 53 has been provided at the output of each of the other two gear assemblies, and thus assuming in each case that the output gear of the gear assemblies is a 9 inch diameter internal gear FD 34 and that in each case this drives a 1½ inch diameter freely revolving gear D 53 by means of ordinary revolving gears 54 and 55, running on spindles 190, secured in framework 191, then the situation when one considers one revolution of the input disc 36, is that, in the first gear assembly the observed and actual revolutions of the freely revolving 9 inch internal diameter gear FD 34 will be $A/B \times C/FD + 1$ namely $1\frac{1}{2}/\frac{3}{4} \times 3\frac{3}{4}/9 + 1$, i.e., 1 and 5/6ths revolutions actual and observed. This 1 and 5/6ths r.p.m. of the gear FD 34 in now transferred to the 1½ inch diameter freely revolving centre gear D 53 by means of two fixed spindles, or fixed axis gears 54 and 55, previously described as ordinary revolving gears, so that the speed of the 1½ inch diameter revolving gear D 53 would be 1 and 5/6ths×9 divided by 1½, that is approximately 11 r.p.m. It follows that 11 r.p.m. is the input speed for the second gear assembly so that, since it is identical in construction to the first assembly, the output will be 11×1 and 5/6ths that is approximately 20.163 r.p.m. at the 9 inch internal diameter revolving gear FD 34, thus the speed of the 1½ inch diameter freely revolving centre gear D gear 53 of this assembly is 20.163×9 divided by 1½ that is approximately 121 r.p.m. As can be seen from the drawing, the drive to the second centre gear D 53 is via two fixed centre, or fixed axis gears, 54 and 55 described as ordinary revolving gears 54 and 55, the first of which is driven, by the internal 9 inch diameter gear FD 34. In this gear train 121 r.p.m. is the input speed of the third gear assembly, which being identical in construction to the previous two assemblies, gives an output of 121×1 and 5/6ths i.e., 222 r.p.m. at the 9 inch diameter gear FD 34, so that the speed o the third 1½ inch diameter freely revolving centre gear D 53 will be 222×9 divided by 1½ which is 1332 r.p.m.

If, at the input end of the gear assembly there is provided a 1440 r.p.m. prime mover 27 mounted on the base plate or foundation base 192 with a 1½ inch diameter pulley 60 on its output shaft, driving a 1¾ inch diameter pulley 61, the speed of the latter pulley 61 will be 1234 r.p.m. and if this pulley 61 drives a worm 28 that in turn drives a 40 toothed wormwheel 29 mounted in a framework 119, attached to the base plate or foundation base 192, this first wormwheel will have 30.85 r.p.m. This rate of revolution will be the same as that of a second worm 28 upon which the first wormwheel 29 is mounted, and if the second worm 28 drives a 40 toothed wormwheel 29 the output r.p.m. will be 0.77 namely 30.85/40 Thus in this assembly the input speed of the first assembly would be 0.77 r.p.m. and the speed of the first 9 inch diameter gear FD 34 would be 0.77×1 and 5/6ths that is 1.4116 r.p.m. with the output speed of the gear FD 34, at 1.4116 the freely revolving centre gear D 53 will be rotating at 8.45 r.p.m. that is (1.4116×9/1½) and thus 8.47 becomes the input speed for the input of the second assembly. The output of this second assembly is the speed of the gear FD 34 and will be 8.47×1 and 5/6ths that is 15.528 r.p.m. and thus the freely revolving centre gear D 53 of this assembly will be (15.528×9/1½) to give 93.17 r.p.m. as the input speed of the third assembly, and thus the output speed of the gear FD 34, of this assembly, will be 93.17×1 and 5/6ths, namely 170.8 r.p.m. The output from the third freely revolving centre gear D gear 53 will therefore be (170.8×9/1½) that is 1024 r.p.m. The output pulley 37 secured by screws 68 and dowels 69 to the variable mass flywheels 15, 16, and 17 attached thereto will therefore have a speed of 1024 r.p.m. Also intermediate gears 100 and 101 are shown in the epicyclic gear assemblies 12, 13, and 14 and the epicyclic gears framework, which acts as the input disc 36 is secured by tie bars 78. Also a hub 174 is also attached by screws 175 and dowels 176 to the input flywheels 21 to 25 and to the second wormwheel 29. The assembly in other respects conforms to that previously described.

The arrangements shown in FIGS. 1 to 9 previously described, all illustrate three sets of gear assembly units and clearly these could be built as separate units, shown in FIG. 13, or as a complete assembly. By increasing the number of gear assemblies, for example, by coupling together one or more of the gear trains described, it is possible to provide an arrangement in which an extremely low input drive speed can be applied, thereby enabling the gear assembly to be utilised, for example, for weight lifting, in for example cranes or the like, or in weight balancing machines or apparatus. In this latter case, the apparatus can be adapted to operate in such a way that for one revolution of the input of the first gear assembly and also one revolution at the output of a similar gear assembly, one can have the situation in which a small diameter central output gear D 35 or a gear D 53 as in FIG. 10 is making for example 1000 r.p.m. to result in one revolution of an extremely large gear 62 in mesh therewith, this large gear 62 making one revolution in comparison to one revolution of the input (the output end of such a gear train is shown in FIG. 10). However an extremely large gear wheel may result in design difficulties and thus it is envisaged that the same result could be obtained by substituting for the very large gear, a compound reduction gear of the kind shown in FIG. 11. Alternatively as shown in FIG. 12 worm and wormwheel reduction means may be employed with bevel wheels 193 substituted for the gear D 53, these bevel wheels 193 driving a worm 28 and wormwheel 29.

Also it would be noted that previously the FIGS. from 1 to 9 concern an external fixed gear A 30 and an internal fixed gear F 31 and a centre revolving gear D 35 or internal revolving gear FD 34 driven by integral epicyclic gears B 32 and C 33, these integral gears B 32 and C 33 being of different diameters.

Figure 15:
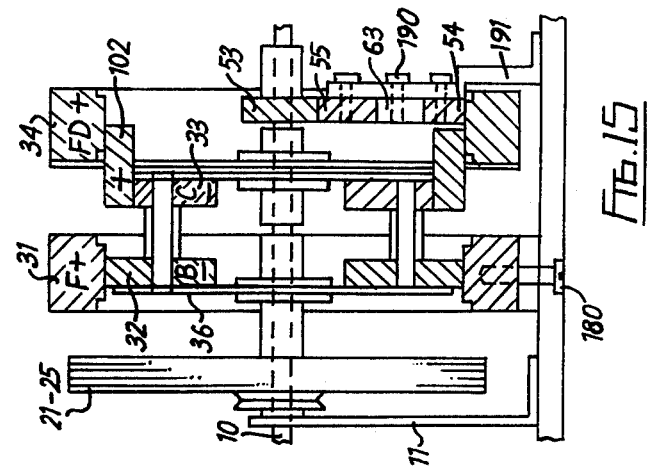
Figure 14:
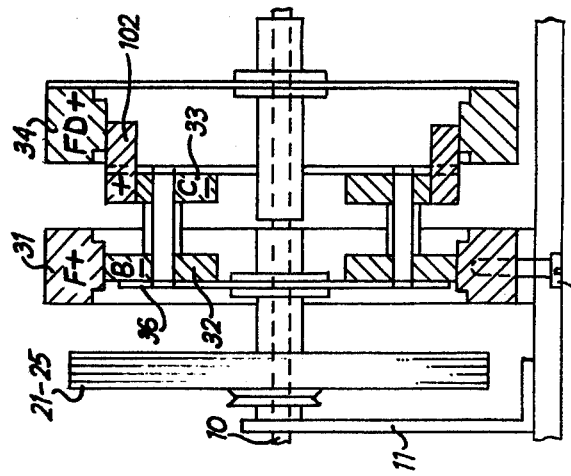

Now in FIG. 14 and FIG. 15 examples are shown, with a fixed internal gear F 31 utilised with a freely revolving internal gear FD 34 with the integral gears B 32 and C 33 now being of equal diameters with intermediate gears 102 in mesh with gear C 33 and freely revolving gear FD 34. So that the observed and actual revolutions of the freely revolving gear FD 34 would be $F/B \times C/FD + 1$ and when F=9, B=3, C=3 and FD=9 then 9/3×3/9+1=1+1=2 actual and observed revolutions of internal gear FD 34.

FIG. 15 is similar to FIG. 14 but in FIG. 15 a series of ordinary revolving gears 54, 55, and 63 running on spindles 190 secured in a framework 191 are in mesh with the internal revolving gear FD 34 and a centre gear D 53 say for example of 1½ inch diameter. Also are shown the fixed spindle 10 with carrier 11 and the input disc 36 and flywheel discs 21 to 25 and securing screws 180.

Also when a fixed internal diameter gear F 31 is utilised with integral gears B 32 and C 33 of equal diameter as shown in FIG. 16 then in this case the gear C 33 can be omitted and the assembly would then be as in FIG. 17 with the gears B 32 in mesh with a centre freely revolving gear D 35, the gears B 32 running on spindles 103 secured in the input discs 36. So that when F=9, B=3, C=3 and D=3 then the actual and observed revolutions of centre gear D 35 would be F/B×C/D+1 which is 9/3×3/3+1=3+1=4 and when C 33 is omitted, then the actual and observed revolutions D 35 would be $$\frac{F}{B} \times \frac{\text{omitted } C \text{ same size as } B}{D} + 1$$

or actual and observed revolutions of D 35, are F/B×B/D+1 so that F=9, B=3, B=3 and D=3 then F/B×B/D+1=9/3×3/3+1=3+1=4. Also are shown the fixed spindle 10, with carrier 11 and the input disc 36 and flywheel disc 21 to 25 and securing screws 180.

Figure 18:
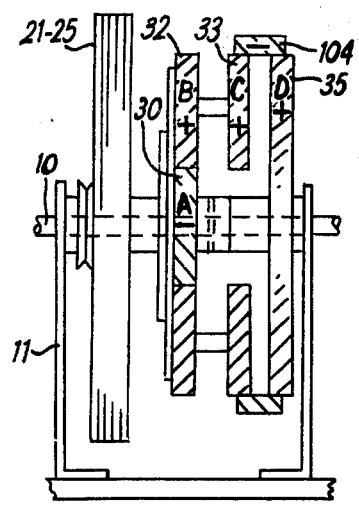

Also as in FIG. 18 an external fixed gear A 30 could be utilised with an external freely revolving gear D 35 with equal diameter integral gears B 32 and C 33 and intermediate gears 104. So that the observed and actual revolutions of the freely revolving external gear D 35 would be A/B×C/D+1 and when A=3, B=3, C=3, D=9, then 3/3×3/9+1=1×⅓+1=1⅓ actual and observed revolutions of external gear D 35.

Figure 19:
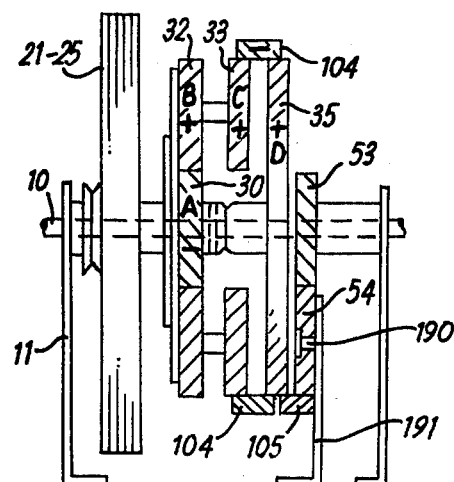

FIG. 19 is similar to FIG. 18 but in FIG. 19 ordinary revolving gears 54 and intermediate gears 104 and 105 are in mesh with the external revolving gear D 35 and also with a centre gear D 53 the ordinary revolving gears 54 running on a spindle 190 in a framework 191 attached to the base. Also are shown the fixed spindle 10, with carrier 11 and the input disc 36 and flywheel discs 21 to 25.

Figure 20:
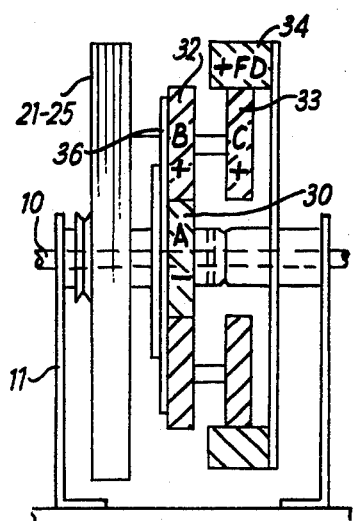

Also in FIG. 20 is shown an external fixed gear A 30 utilised with an internal freely revolving gear FD 34 with equal diameter integral gears B 32 and C 33 so that the observed and actual revolutions of the freely revolving integral gear FD 34 would be A/B×C/FD+1 and when A=3, B=3, C=3 and FD=9 then 3/3×3/9+1=1×⅓+1=1⅓ actual and observed revolutions of internal gear FD 34.

Figure 21:
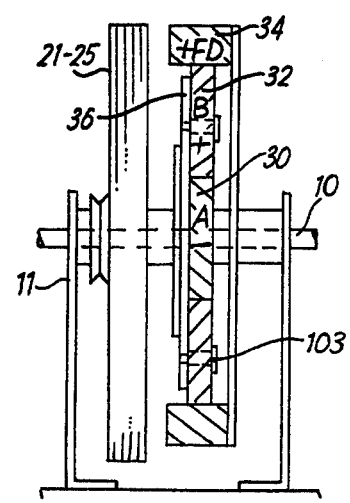
Figure 25:
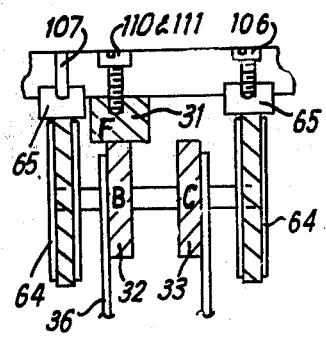
Figure 26:
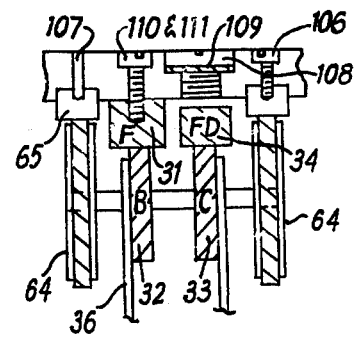

FIG. 21 is similar to FIG. 20 but in FIG. 21 the gear C 33 has been omitted and the gears B 32 run on spindles 103 in the input discs 36 and the actual and observed revolutions of internal gear FD 34 would be $$\frac{A}{B} \times \frac{\text{omitted } C \text{ same size as } B}{FD} + 1$$

or actual and observed revolutions of internal gear FD 34=A/B×B/FD+1 So that when A=3,B=3,B=3, and FD=9 then A/B×B/FD+1=3/3×3/9+1=1×⅓+1=1⅓ actual and observed revolutions of internal gear FD 34. Also are shown the fixed spindle 10 with carrier 11 and the input discs 36 and flywheel discs 21 to 25.

Also as in FIGS. 22 to 27 when the gears, other than the gears with their axes on the centre fixed shaft 10 are revolving epicyclicly round the axis of the centre fixed shaft 10, then the centrifugal force of these orbiting gears would be taken into consideration and to neutralise the effect of the centrifugal force so caused, rollers as in FIGS. 22 to 27 could be attached to the orbiting assemblies, and these rollers 64 would run upon a metal ring or rings 65 recessed into the housing or casing and secured with screws 106 and dowels 107. These rings 65 could be solid, or for larger assemblies a ring constructed of segments could be utilised, bolted and dowelled in position, to the housing or casing, and also the rollers 64 and centrifugal pressure rings 65 could be hardened and ground for endurance. Also, oil filler plugs 108 and sealing rings 109 would be incorporated in the housings or casings, for oil filling and draining purposes, and the fixed internal gears 31 could also be secured to the housings or casings with screws 110 and dowels 111.

Figure 28:
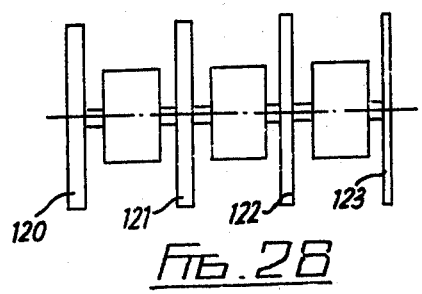
Figure 27:
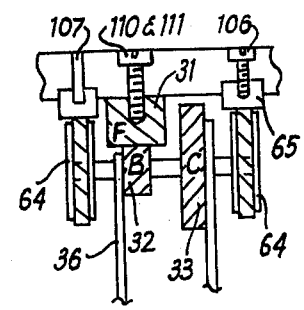
Figure 29:
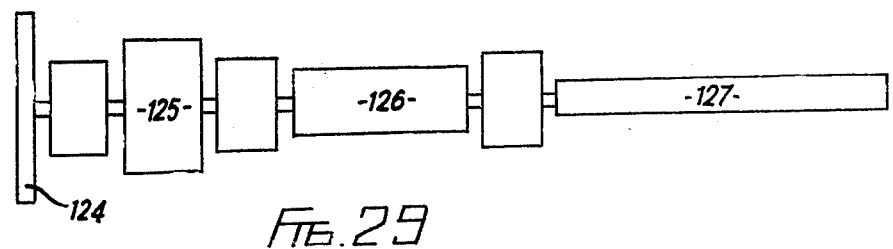

Also in FIG. 28, FIG. 29 and FIG. 30 are shown flywheels at the input and output ends of the unit mechanism assemblies and also in between each unit. Flywheels can also be arranged in the mechanism assemblies with no input flywheels and none between each unit, or in the mechanism assemblies but just with the final output flywyheels or flywheel mass only, as in FIG. 31.

So that when considering FIG. 28 and when the flywheels are all of similar diameter, then flywheel 120 would be say of mass 1, revolving say at 8 r.p.m. and flywheel 121 would be revolving 5 times as fast at 40 r.p.m. and would be 1/5 mass in comparison to flywheel 120. Similarly flywheel 122 revolving at 200 r.p.m. that is 5 times faster than flywheel 121 would be 1/25 mass by comparison to flywheel 120 and flywheel 121. Similarly flywheel 123 revolving at 1000 r.p.m. that is 5 times faster than flywheel 122 would be 1/125 mass by comparison to flywheels 120, 121 and 122. So that the momentums of each mass flywheel would be say, 1×8=8 and 1/5×40=8 and 1/25×200=8 and 1/125×1000=8 and the kinetic energy of the flywheel masses would be say 1×8²=64 and 1/5×40²=320 and 1/25×200²=1600 and 1/125×1000²=8000 i.e. rising in multiples of 5.

When now the flywheel masses are reduced in diameter as in FIG. 29 as 124, 125, 126 and 127 so that they are all of equal mass and their rotary velocity is also equal, then this would be as FIG. 29. So that in FIG. 29 the momentum of each mass would be equal, as in the previous FIG. 28 and now in FIG. 29 the kinetic energy of the masses would also be equal and masses 125 and 126 could be omitted, leaving mass 124 and 127 or masses 124, 125, and 126 could be omitted leaving mass 127 alone as shown in FIG. 31.

When now in the gear arrangements as shown in FIG. 1 then for 1 revolution of the input disc 36 the revolutions of the gear D 35 are as A/B×C/D+1 or 1½/¾×3/1½+1 which is 5 revolutions. So that, when considering say one unit, then when the input revolutions and the output revolutions are made the same, say for example, 1 input revolution and 1 output revolution, then the masses balanced, would be as the ratio is of gear B 32 is to gear C 33 and in this case of FIG. 1. this is ¾ is to 3, namely a ratio of 4. So that considering the previous FIG. 28 when the diameters and relative masses of the wheels were similar, then the following as in FIG. 30 would apply, namely mass 128 would be say of mass 1 revolving at say 8 r.p.m. and mass 129 would be of mass 4, revolving at 8 r.p.m. and mass 130 would be of mass 16 revolving at 8 r.p.m. and mass 131 would be of mass 64 revolving at 8 r.p.m. and this making the input and output revolutions equal, could be achieved by inserting reduction gearing between each unit, as shown in FIG. 30. That is say the output gear D 53 of the first unit is 1½ inches diameter and meshing with the 1½ inch diameter gear D 53 is a gear 132 of 7½ inch diameter integral with which is the gear 133 of 1½ inch diameter and meshing with this 1½ inch diameter gear 133 is an intermediate gear 134 which meshes with the input gear 135 of 1½ inch diameter which is the input gear of the second unit. So that the mass flywheel 129 is slowed by a ratio of 5, and this arrangement is shown applied to the other units, and it would be noted that, if the intermediate gear 134 of the last output unit was made into 2 gears, then reverse rotation of the mass 131 would occur.

FIG. 31 is similar to FIG. 30 but now the masses 128 129 and 130 have been omitted leaving mass 136 alone at the output end. So that now, when the input revolutions are multiplied by 125 to give 1000 r.p.m. input revolutions then the following as in FIG. 31 would apply. In FIG. 31 the prime mover is a 1440 r.p.m. motor 27 on the shaft of which is a pulley 137 of 1.042 inch diameter driving an input pulley 138 of 1½ inch diameter. So that the input revolutions to the first unit would be 1000 r.p.m. As the gears in the first unit are as in FIG. 1. then the output gear D 53 of the first unit would make 5000 r.p.m. and this 5000 r.p.m. gear D 53 is in mesh with a 7½ inch diameter gear 132 integral with which is the gear 133 of 1½ inch diameter. So that the revolutions of the 7½ inch diameter gear 132 and 1½ inch diameter gear 133 would be 1000 r.p.m. This 1000 r.p.m. gear 133 is in mesh with an intermediate gear 134 which in turn is in mesh with 1½ inch diameter input gear 135 of the second unit. So that the input speed of the second unit is 1000 r.p.m. similar to the input speed of the first unit. Similar conditions would apply to the third unit. The units are supported on a channel 140, also supported on the framework 139 housing the reduction gears 53, 132, 133, 134 and 135 these being mounted as shown in FIG. 31 on a base plate or foundation base.

FIG. 32 shows a centre gear D 53 being in mesh with intermediate gears 55 and 54 mounted in a bracket 191 and the intermediate gear 54 is in mesh with a freely revolving internal diameter gear FD 34.

FIG. 33 shows a similar arrangement to FIG. 32 but now in FIG. 33 the rotation of the centre gear D 53 would be opposite to that in FIG. 32.

In FIG. 34 and also if reference is made to FIG. 1. then when a similar gear assembly, as that in FIG. 1 is utilised, as in the arrangement shown in FIG. 34 then when also reference is made to FIG. 30 then the gear arrangement as in FIG. 1 could be arranged as in FIG. 34. That is, fixed gear A 143 is 1½ inch diameter and gears B 144 are ¾ inch diameter and gears C 145 are 3 inch diameter and gear D 146 is 1½ inch diameter. So that the output revolutions of the gear D 146 would be A/B×C/D+1 which is 1½/¾×3/1½+1 which is 2×2+1 which is 5 revolutions. So that the gear D 146 at 1½ inch diameter would make 5 revolutions, and this gear D 146 of 1½ inch diameter, making 5 revolutions would also cause a gear D 142 also of 1½ inch diameter which is an extension of the gear D 146 to also make 5 revolutions. This 1½ inch diameter gear D 142 making 5 revolutions now meshes with a 7½ inch diameter gear 141, so that this 7½ inch diameter gear 141 would make 1 revolution. Meshing with the fixed gear A 143 of 1½ inch diameter and the gears B 144 of ¾ inch diameter are the intermediate gears 147 of 1⅛ inch diameter and if the intermediate gears 147 were made into two separate gears, then reverse rotation of the assembly gears would take place.

The gear A 143 is fixed, but the intermediate gears 147 and the gears B 144 and the gears C 145 which are integral and the gear D 146 are free to revolve, and are located in frame bars 153 secured by tie bars 158. These frame bars 153 are pivotted about a centre spindle 148. The 7½ inch diameter gear 141 is fixed to a bar 154 by screws 194 and dowels 195 and this bar 154 is free to pivot about the spindle 149. The spindle 148 secured to bearing brackets 155, by pegs 156 and spindle 149 are supported in the bearing brackets 155, the bases of which would be secured to a bench or base. In the frame bars 153 and 154 are fixed, spindles or studs 152, of equal lengths and diameters, the centre pivotting distances of these studs or spindles 152 being equidistant from the pivotting centres 148 and 149. So that it could be said, that when the frame bars 153 and bar 154 are equal in length and in horizontal parallel position as shown in FIG. 34 then the mechanism assembly would be in balance. So that now it could be said that, when 1 revolution of the frame bars 153 is made, say in an anti-clockwise direction, round the fixed gear A 143 secured to the spindle 148 by pegs 157 then this would cause the gear assembly to revolve epicyclically round the fixed gear A 143 and so cause bar 154 to which is attached the 7½ inch diameter gear 141 to revolve also in an anti-clockwise direction.

When now, a mass weight 159 of say mass one is placed on the left hand spindle or stud 152 in the frame bars 153, then this would fall in an anti-clockwise manner and so cause the bar 154 to revolve, also in an anti-clockwise manner. When now, a mass weight 160 is placed on the right hand side spindle or stud 152 on the bar 154 then this mass weight 160 would oppose the falling of the mass weight 159 of mass one, placed on the left hand side spindle or stud 152 in the frame bars 153. Previously it is stated that the integral gears B 144 and C 145 are ¾ inch diameter and 3 inch diameter respectively, and this ratio of ¾ is to 3, is a ratio of 1 is to 4. So that with the epicyclic gear assembly shown in FIG. 34 than a mass weight 159 of mass one placed on the spindle or stud 152 would balance a mass weight 160 of mass 4 (or just slightly less than 4) placed with care on a spindle or stud 152 on the opposite side to that of the mass one 159. So that their masses are opposed and also the frame bars would still be in a horizontal balanced position. So that it would be noted that when say the mass weight 160 is removed from the assembly, then the mass weight 159 would drop with an acceleration, due to gravity. Similarly when say the mass weight 159 is removed from the assembly, then the mass weight 160 would drop with an acceleration, due to gravity. When now, the mass weight 160 and the mass weight 159 are replaced with the frame bars 153 and 154 in the horizontal position as shown in FIG. 34 then when movement of the mass weight 159 occurs then this would cause the balanced mass weight 160 also to move in a corresponding manner and this movement of the balanced masses would be a movement of velocity, and not acceleration.

So that, say, for example, the balanced masses 159 and 160 move with a velocity of one, due to both masses being placed, equidistant, from the centre pivot then the mass weight 159 would move with a mass of one and a velocity of one, whereas the mass weight 160 would move with a mass of 4 and a velocity of one.

So that when now, mass weight 159 of mass one, is placed on a fixed spindle or as the same fixed spindle 10, in the previous FIGS., on which the gear A 30, is fixed, and when the mass weight 160 of mass 4 is placed also on the same fixed spindle 10, these masses being at the input and output ends of the epicyclic gear assembly, then the mechanism shown in the FIG. 34 assembly could become as the FIG. 30. So that when referring now to FIG. 34 the equal centre pivotting distances of the mass weight 159 and the mass weight 160 could be regarded as the radius of gyration of revolving circular discs. So the momentum of mass weight 159 of mass one, moving at say a velocity of one, would have a momentum of one, and the momentum of the balanced mass weight 160 of mass 4 moving at say a velocity of one, would have a momentum of 4. Similarly the kinetic energy of the balanced revolving masses revolving at a velocity of one, would be for mass weight 159, mass one times a velocity of one, times one, which is one, and the kinetic energy of mass weight 160, would be, mass 4 times a velocity of one times one, which is 4. So that by comparison, mass weight 160 would possess 4 times the momentum and 4 times the kinetic energy of mass weight 159.

Also as shown in FIG. 34 when the frame bars 153 tend to make one revolution, then the bar 154 also tends to make one revolution and when the mass weight 159 and mass weight 160 are placed, with inertia borne in mind, in position with care, as in FIG. 34 then the assembly would be in balance and no movement would occur. It is to be noted that the mass weight 159 and mass weight 160 are placed diametrically opposite with their tendency to motion opposed, and this could also be arranged, if required, in the gear assemblies shown, in the previous FIGS. by the insertion of an additional intermediate gear which would not be detrimental to the mechanical efficiency of the arrangements.

It is with renown, that large reduction gear unit assemblies are utilised, in modern arrangements for ship propulsion. So that in the assemblies shown, such as say in FIG. 30 when comparatively low output revolutions are required, the reduction gearing drives between the units could be by suitable worm and wheel reduction gearing, and if required, input and output masses could be utilised in the last unit, with the input and output masses omitted in other units. Also in arrangements when the reduction gearing between the units is large, with any comparative low output revolutions, then such arrangements could be adaptable for and applied to ship propulsion and it would be apparent that to have high output revolutions for ship propulsion would be a repulse for high revolutions due to the high inertia of the very heavy mass of the ships. So that when reduction gearing is utilised, between the gear units, as stated, then oil filler and drainage plugs and seals could be incorporated in the hood, or cover, of the assemblies, to facilitate functioning of the mechanism assemblies.

Further practical applications of the gear unit assemblies could be utilised as in FIG. 35 and FIG. 36. FIG. 35 shows 3 gear units 161,162 and 163 such as those utilised in the previous FIGS., and these gear units are assemblied in a vertical manner, so that the input gear 164 and output gears 165 are opposite on each unit. So that a prime mover 168, secured on a bridge 173, would drive the input gear 164 of the unit 161 through motor driving gear 166 and intermediate gear 167. So that the input gear 164 on the first unit 161 driving through the unit 161 would cause the output gear 165 of the first unit 161 to revolve, and this output gear 165 of the first unit 161 would now drive, through intermediate gear 167, the input gear 164 of the second unit 162 which would cause the output gear 165 of the second unit 162 to revolve, and so drive, through the intermediate gear 167 the input gear 164 of the third unit 163 which in turn would cause the output gear 165 of the third unit 163 to revolve and this revolving output gear 165 of the third unit 163 would through intermediate gear (or gears) 169 drive a gear 171, this gear 171 being integral and part of a railway bogie waggon wheel 170, with the wheels 170 running on railway lines, or other tracks. The whole assembly would be supported on a frame or bridge 173 which would be part of the railway bogie assembly and through which passes the spindle or spindles 172. So that when the prime mover, or say an electric motor 168, is energised with power from say an overhead pantagraph, or by means of central rail ground power supply, the gear unit assemblies would transmit the power to the locomotive waggon or bogie wheels and so propel the complete assembly along the rails or track, the speed and distance propelled being relative to the gear unit assemblies utilised.

FIG. 36 is similar to FIG. 35 but in FIG. 36 the gear unit assemblies are arranged horizontally.

These arrangements could also be adapted to other forms of locomotion other than tracked vehicles and whilst these arrangements are adaptable to tracked vehicles they could also be utilised for other forms of locomotion.

In FIG. 37 is shown an arrangement of how the mechanism assembly in the apparatus demonstrating balancing of masses as in FIG. 34 could be adapted to be similar to say a conventional pair of scales, and it would be noted that the centre of gravity of the masses so balanced would be similar. The reference numerals are as in FIG. 34. What I claim is:

1. An epicyclic gear mechanism having a single fixed shaft; a series of compound gear trains surrounding the single fixed shaft, the shaft being common to the series of compound gear trains, each compound gear train including a rotatable cage, at least two planet gears of compound form on the cage and rotatable relative to the cage, a stationary gear operably associated with one gear of the compound planet gear, and an output gear operably associated with the other gear of the compound planet gear, said output gear being rotatable on the fixed shaft relative to the cage and connected to a gear or an input means of a successive compound gear train, each successive gear train in the series providing a stepwise increase in output speed; and a final output means for defining a gear operably associated with one gear of the last compound planet gear of the last compound gear train of the series, said final output gear being rotatable around said fixed shaft and being attachable to an output device.

2. An epicyclic gear mechanism as claimed in claim 1, in which one of said cages includes four planet gears on an input side of the cage, the latter comprising a pair of spaced-apart disc-like elements connected together for simultaneous rotation.

3. An epicyclic gear mechanism as claimed in claim 1, in which the stationary gear is a sun pinion mounted on the fixed shaft and in which input to the gear train is through the cage to the planet gears, the latter being pinions of compound form and being mounted one on the input side of the cage and one on the output side, the output gear being also in the form of a sun pinion rotatable on the fixed shaft and connected to the input gear of a successive gear train.

4. An epicyclic gear mechanism as claimed in claim 3, in which the output gear is a sun gear, the output sun gear of the first and successive gear trains being connected to the input pinion of the successive gear trains, with the exception of the output sun pinion of the last gear train, through the cage, the input pinions of the successive gear trains being planet gears.

5. An epicyclic gear mechanism as claimed in claim 3, in which an intermediate pinion is located between the stationary sun pinion and input planet pinions at the input side of the cage, the mechanism including an intermediate pinion between the rotatable sun pinion and each of the planet pinions at the output side of the cage.

6. An epicyclic gear mechanism as claimed in claim 3, in which the output sun pinion of the last gear train is connected to an output pulley or gear on the fixed shaft.

7. An epicyclic gear mechanism as claimed in claim 1, in which the stationary gear and planet gears of each train are pinions, the stationary pinion being in the form of a gear ring extending around and enmeshed with the planet pinions at the input side of the cage, the planet pinions of the output side of the cage being connected to an output sun pinion rotatable around the fixed shaft and connected to the input planet pinions of a successive gear train through the input side of the cage.

8. An epicyclic gear mechanism as claimed in claim 7, in which the final output gear is in the form of a sun pinion rotatable around the fixed shaft and connected to an output gear or pulley also rotatable on the fixed shaft.

9. An epicyclic gear mechanism as claimed in claim 1, including a flywheel positioned between the first gear train and a prime mover, and a further flywheel attached to the final output pulley or gear.

10. An epicyclic gear mechanism as claimed in claim 1, in which a predetermined number of the gear trains have a stationary gear pinion in the form of a sun gear mounted on the fixed shaft and other gear trains have a stationary gear pinion in the form of a gear ring surrounding and enmeshed with the planet pinions at the input side of the gear train.

11. An epicyclic gear mechanism as claimed in claim 1, in which a reduction gear system is provided between a prime mover and the input gear of the first gear train.

12. An epicyclic gear mechanism as claimed in claim 1, in which the stationary gear is in the form of a gear ring extending around and enmeshed with the planet gears of the first gear train, there being a drive connection between the planet gears of the first gear train and a free gear ring of a subsequent gear train which includes a sun gear, the latter being the output gear of the subsequent gear train.

13. An epicyclic gear mechanism as claimed in claim 1, in which the stationary gear is in the form of a sun gear on the fixed shaft, said sun gear meshing with a series of intermediate gears including planet gears adapted to drive a free gear ring of a subsequent gear train which includes a sun gear, the latter being the output gear of the subsequent gear train.

* * * * *